US011516957B2

(12) United States Patent
Baurer et al.

(10) Patent No.: US 11,516,957 B2
(45) Date of Patent: Dec. 6, 2022

(54) SEEDING CONTROL SYSTEM AND METHOD

(71) Applicant: Precision Planting LLC, Tremont, IL (US)

(72) Inventors: Phil Baurer, Tremont, IL (US); Keith Beyer, Congerville, IL (US); Ben Schlipf, Tremont, IL (US); Justin Koch, Deer Creek, IL (US)

(73) Assignee: Precision Planting, LLC, Tremont, IL (US)

(*) Notice: Subject to any disclaimer, the term of this patent is extended or adjusted under 35 U.S.C. 154(b) by 147 days.

(21) Appl. No.: 16/919,733

(22) Filed: Jul. 2, 2020

(65) Prior Publication Data

US 2020/0329630 A1  Oct. 22, 2020

Related U.S. Application Data

(63) Continuation of application No. 15/965,276, filed on Apr. 27, 2018, now Pat. No. 10,736,258, which is a continuation of application No. 13/812,483, filed as application No. PCT/US2011/045587 on Jul. 27, 2011, now Pat. No. 9,955,625.
(Continued)

(51) Int. Cl.
| *A01C 7/10* | (2006.01) |
| *H04L 5/00* | (2006.01) |
| *G01C 21/00* | (2006.01) |
| *A01C 21/00* | (2006.01) |

(52) U.S. Cl.
CPC ............. *A01C 7/102* (2013.01); *A01C 7/107* (2013.01); *A01C 21/005* (2013.01); *H04L 5/001* (2013.01); *H04L 5/005* (2013.01); *H04L 5/0016* (2013.01); *H04L 5/0019* (2013.01); *H04L 5/0048* (2013.01); *H04L 5/0053* (2013.01); *A01C 7/105* (2013.01)

(58) Field of Classification Search
None
See application file for complete search history.

(56) References Cited

U.S. PATENT DOCUMENTS

| 6,285,938 B1 * | 9/2001 | Lang .................. A01M 7/0089 239/10 |
| 2003/0009282 A1 * | 1/2003 | Upadhyaya .......... A01B 79/005 701/50 |

(Continued)

*Primary Examiner* — Todd Melton
*Assistant Examiner* — Jason R Roberson

(57) ABSTRACT

A method of maintaining a desired seed population rate during periods of acceleration of the agricultural planter. In one method, if the horizontal acceleration of the planter is greater than a predefined upper threshold, the seed disc is driven at a rotational speed to maintain the desired seed population rate based on a highest stable ground speed. In another method, if the horizontal acceleration is less than a predefined lower acceleration threshold, the seed disc is driven at a rotational speed to maintain the desired seed population rate based on a lowest stable ground speed. In another method, if the horizontal acceleration is less than the predefined upper acceleration threshold and is greater than the predefined lower acceleration threshold, the seed disc is driven at a rotational speed to maintain the desired seed population rate based on an a preferred planter ground speed input.

16 Claims, 32 Drawing Sheets

Related U.S. Application Data

(60) Provisional application No. 61/368,117, filed on Jul. 27, 2010.

(56) References Cited

U.S. PATENT DOCUMENTS

| | | | | |
|---|---|---|---|---|
| 2003/0159633 A1* | 8/2003 | Upadhyaya | .......... | A01C 21/005 |
| | | | | 111/200 |
| 2004/0206282 A1* | 10/2004 | Sandoval | ............... | A01C 19/04 |
| | | | | 111/52 |
| 2004/0231575 A1* | 11/2004 | Wilkerson | ............... | A01C 7/06 |
| | | | | 111/127 |
| 2008/0105177 A1* | 5/2008 | Dix | ......... | A01C 7/087 |
| | | | | 111/200 |
| 2009/0292426 A1* | 11/2009 | Nelson | ................. | A01C 21/005 |
| | | | | 701/50 |
| 2010/0010667 A1* | 1/2010 | Sauder | .................. | A01C 7/205 |
| | | | | 345/440.2 |
| 2010/0131095 A1* | 5/2010 | Zielke | ................... | A01C 7/046 |
| | | | | 700/232 |
| 2013/0124055 A1* | 5/2013 | Baurer | ................. | H04L 5/0053 |
| | | | | 701/461 |
| 2014/0277965 A1* | 9/2014 | Miller | ................. | A01C 21/005 |
| | | | | 701/50 |

\* cited by examiner (Planter w/o Swath Control – Underplant)

(Planter w/o Swath Control – Overplant)

(Planter w/o Swath Control - 50/50)

(Planter w/ 1-Row Swath Control)

(Planter w/ 2-Row Swath Control - Underplant)

(Planter w/ 2-Row Swath Control – Overplant)

(Planter w/ 2-Row Swath Control - 50/50)

(Planter w/ VRS and 1-Row Swath Control)

SEEDING CONTROL SYSTEM AND METHOD

CROSS-REFERENCE TO RELATED APPLICATIONS

This application is a continuation of U.S. patent application Ser. No. 15/965,276, filed Apr. 27, 2018, which is a continuation of U.S. patent application Ser. No. 13/812,483, filed Jan. 25, 2013, issued May 1, 2018 as U.S. Pat. No. 9,955,625, which is a National Stage of International Patent Application No. PCT/US2011/045587, filed Jul. 27, 2011, which claims the benefit of U.S. Provisional Application No. 61/368,117, filed Jul. 27, 2010, each of which is incorporated herein by reference.

BACKGROUND

Planters with variable rate seeding ("VRS") control systems which allow the seeding rate to be varied while on-the-go based on soil type and soil conditions are well known in the art. Likewise, it is also well known in the planter art to provide "swath control" systems to start and stop seeds being planted in individual rows or sets of rows while on-the-go to minimize overplanting in point rows or underplanting when entering or exiting headlands, around waterways and field boundaries.

Currently available VRS and swath control systems cooperate with Global Position Systems ("GPS") and field coverage maps to control the seed meter by engaging and disengaging drive clutches so as to control the rotation and/or speed of rotation of the seed disc for vacuum meters or the rotation of the fingers for finger pick-up meters. However, such systems rely on planter location at the time commands are sent to the VRS and swath control systems rather than accurately determining when the seed is actually physically placed in the field. As a result, significant overplanting, underplanting or other inaccuracies can still occur with planters equipped with VRS and swath control systems which rely solely on GPS and coverage maps. For example, if a farmer starts planting but one or more row units are not dispensing seeds due to a malfunction, the field coverage map will show that the area has been planted even though no seed was actually dispensed. It would then be difficult to truly plant that area once the farmer realized the error.

Accordingly there is a need for an improved seeding control system that provides the advantages of VRS and swath control, but which is based on precise seed placement mapping as opposed to GPS-based coverage mapping to minimize overplanting and underplanting of fields.

DESCRIPTION

Figure 2:
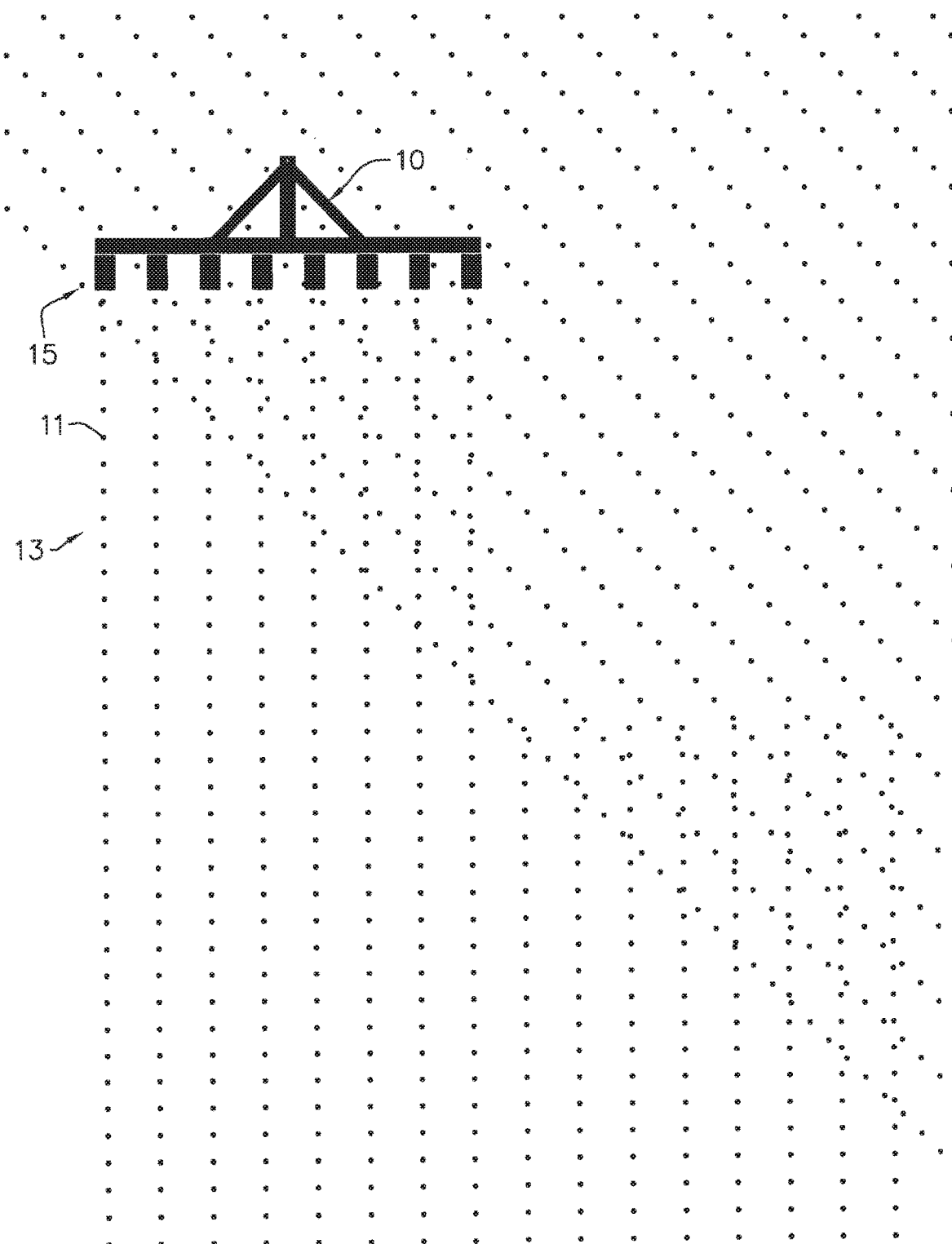
FIG. 2 shows an eight-row planter without swath control illustrating overplanting of a headland.
Figure 3:
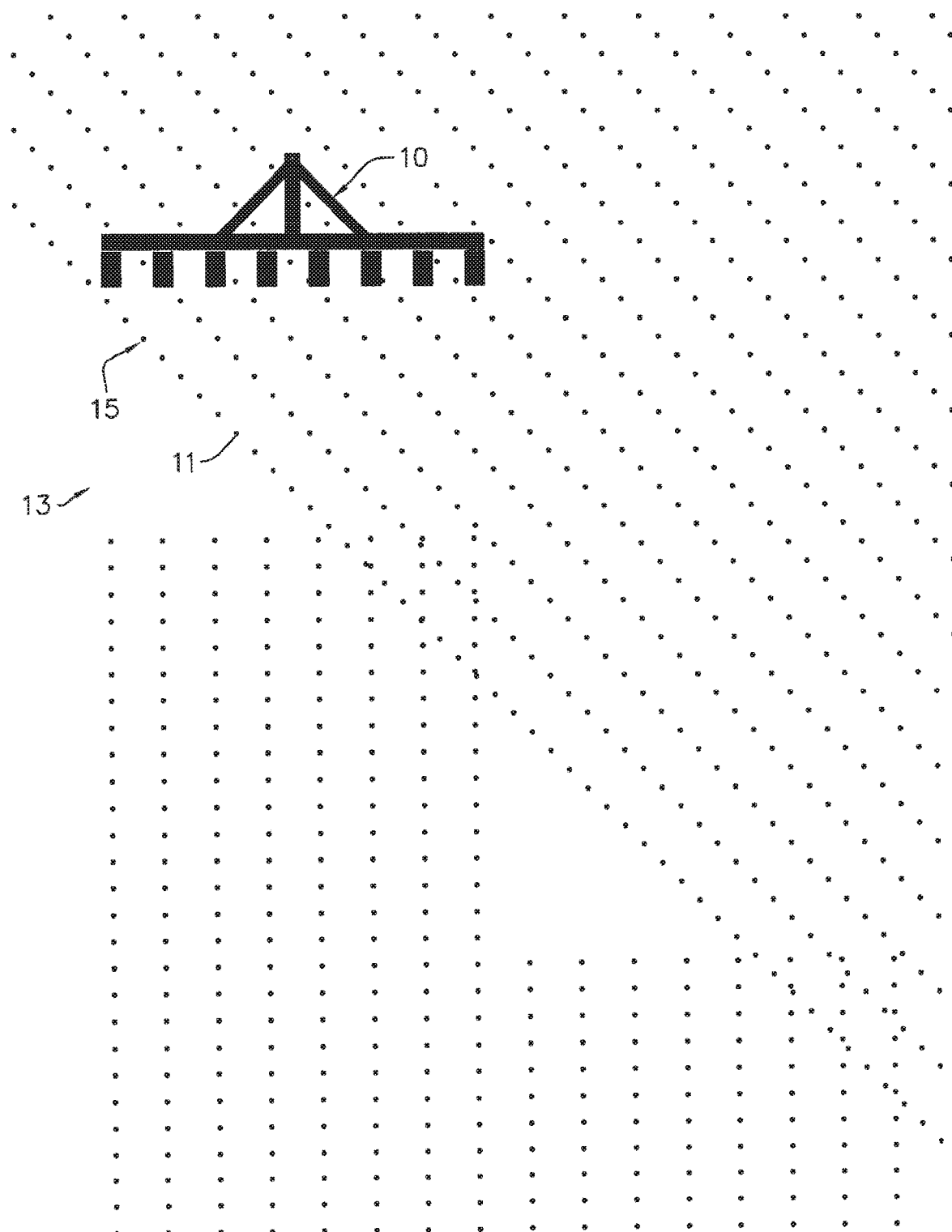
FIG. 3 shows an eight-row planter without swath control illustrating 50/50 underplanting-overplanting of a headland.
Figure 4:
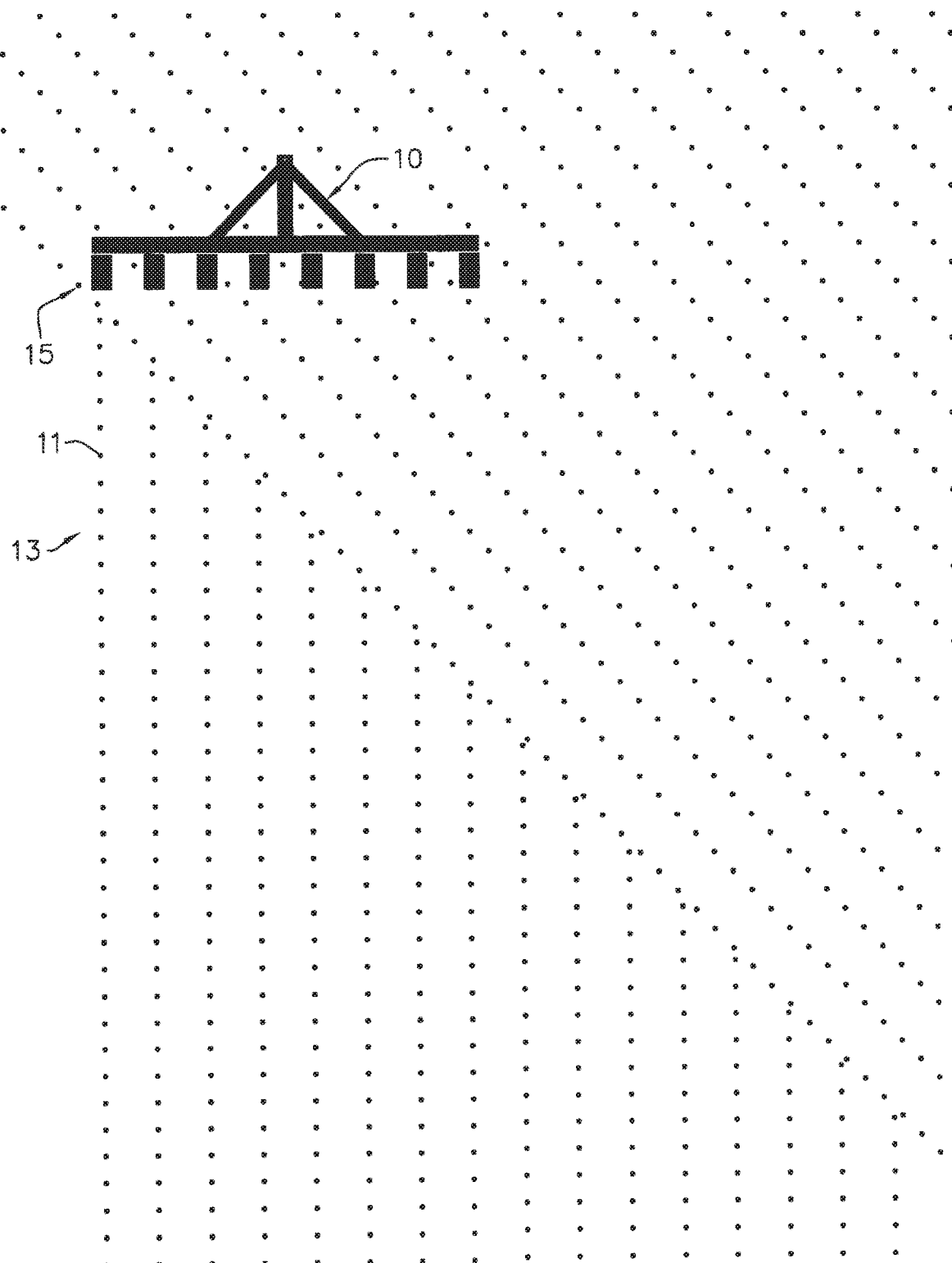
FIG. 4 shows an eight-row planter with 1-row swath control illustrating ideal planting with no overplanting or underplanting of a headland.

Referring now to the drawings, wherein like reference numerals designate identical or corresponding parts throughout the several views, FIGS. 1-5 show a planter 10 planting seeds 11 in a field 13 in which the headland 15 has been previously planted. FIGS. 1-5 are intended to illustrate for comparison purposes "overplanting" and "underplanting" planting techniques using an eight-row planter without swath control (FIGS. 1-3) and then with swath control (FIGS. 4-5).

Figure 1:
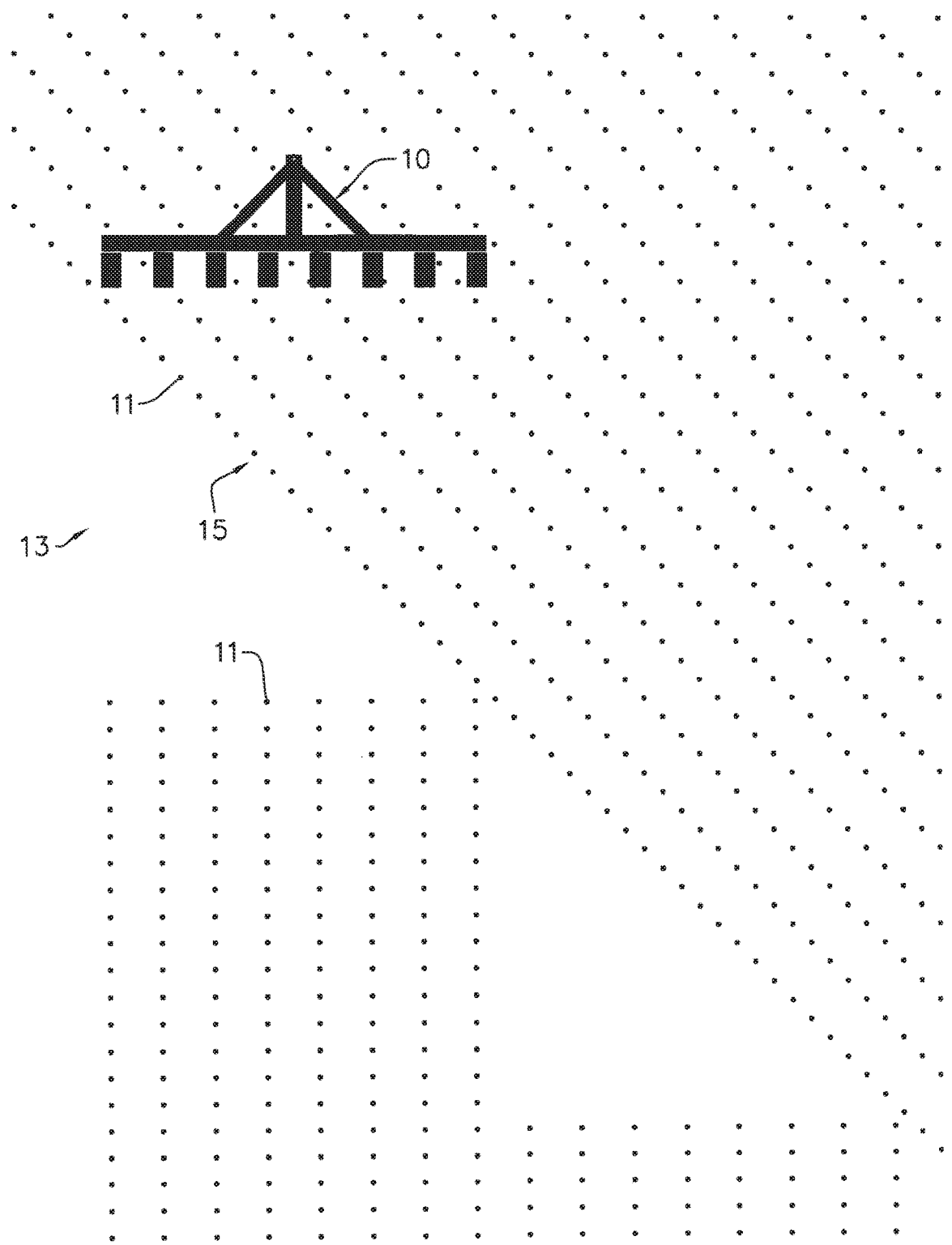
FIG. 1 shows an eight-row planter without swath control illustrating underplanting of a headland.

FIG. 1 shows an eight-row planter without swath control overplanting the headland 15 (i.e., where planting continues across all rows until the last row is within the headland 15). FIG. 2 illustrates an eight-row planter without swath control underplanting the headland 15 (i.e., where planting stops across all rows as soon as the first row enters the headland 15). FIG. 3 shows an eight-row planter without swath control illustrating 50-50 underplanting-overplanting of the headland 15 (i.e., where planting continues across all rows until half of the rows enter the headland 15). It should be understood that the opposite occurs when exiting a headland. That is, when exiting a headland using the overplanting technique, planting begins across all rows as soon as the first row of the planter exits the headland. Likewise, when exiting a headland using the underplanting technique, planting does not begin across all rows until the last row exits the headland. With the 50/50 technique, planting begins across all rows when half of the rows exit the headland.

Figure 5A:
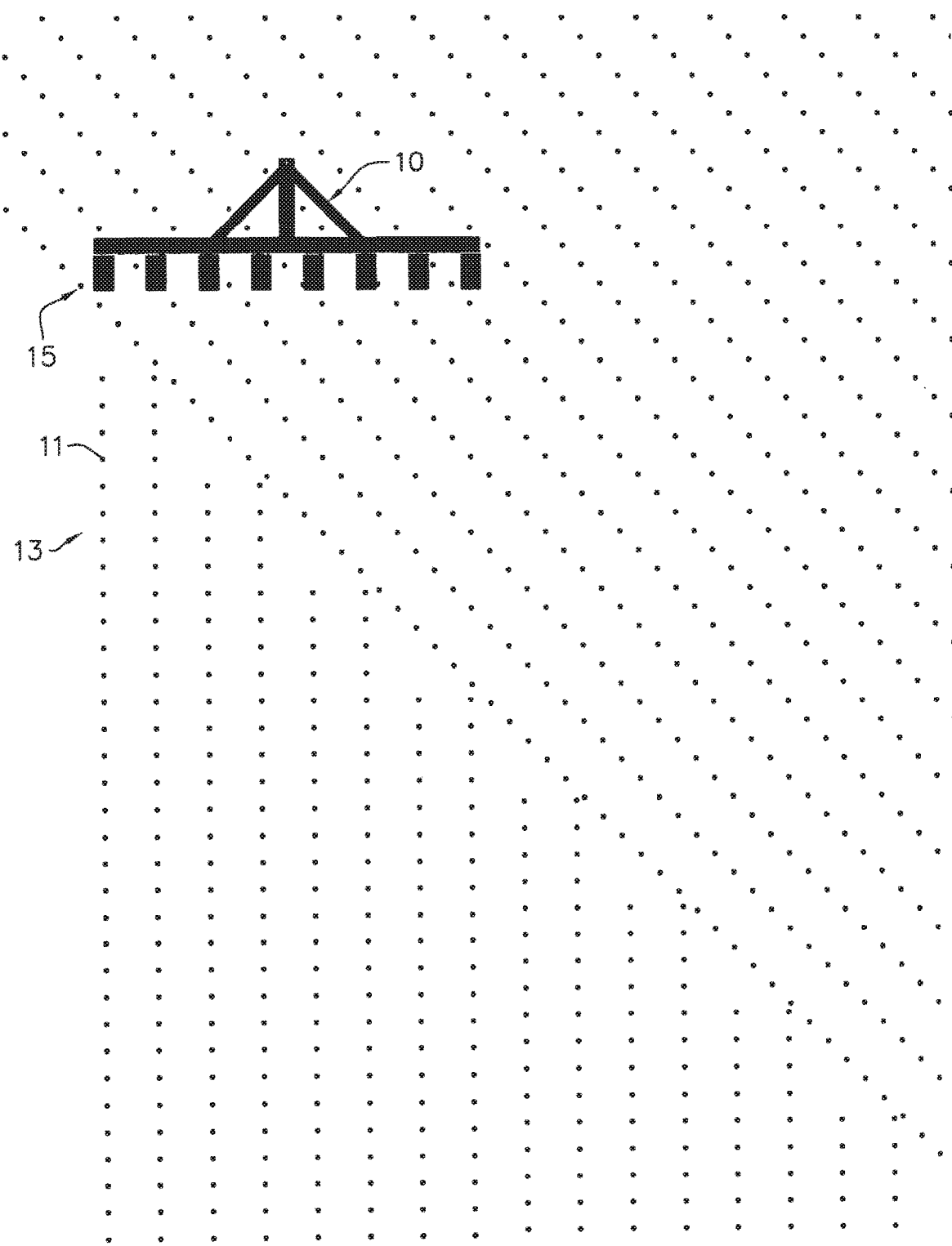
FIG. 5A shows an eight-row planter illustrating underplanting with a 2-row swath control system.
Figure 5B:
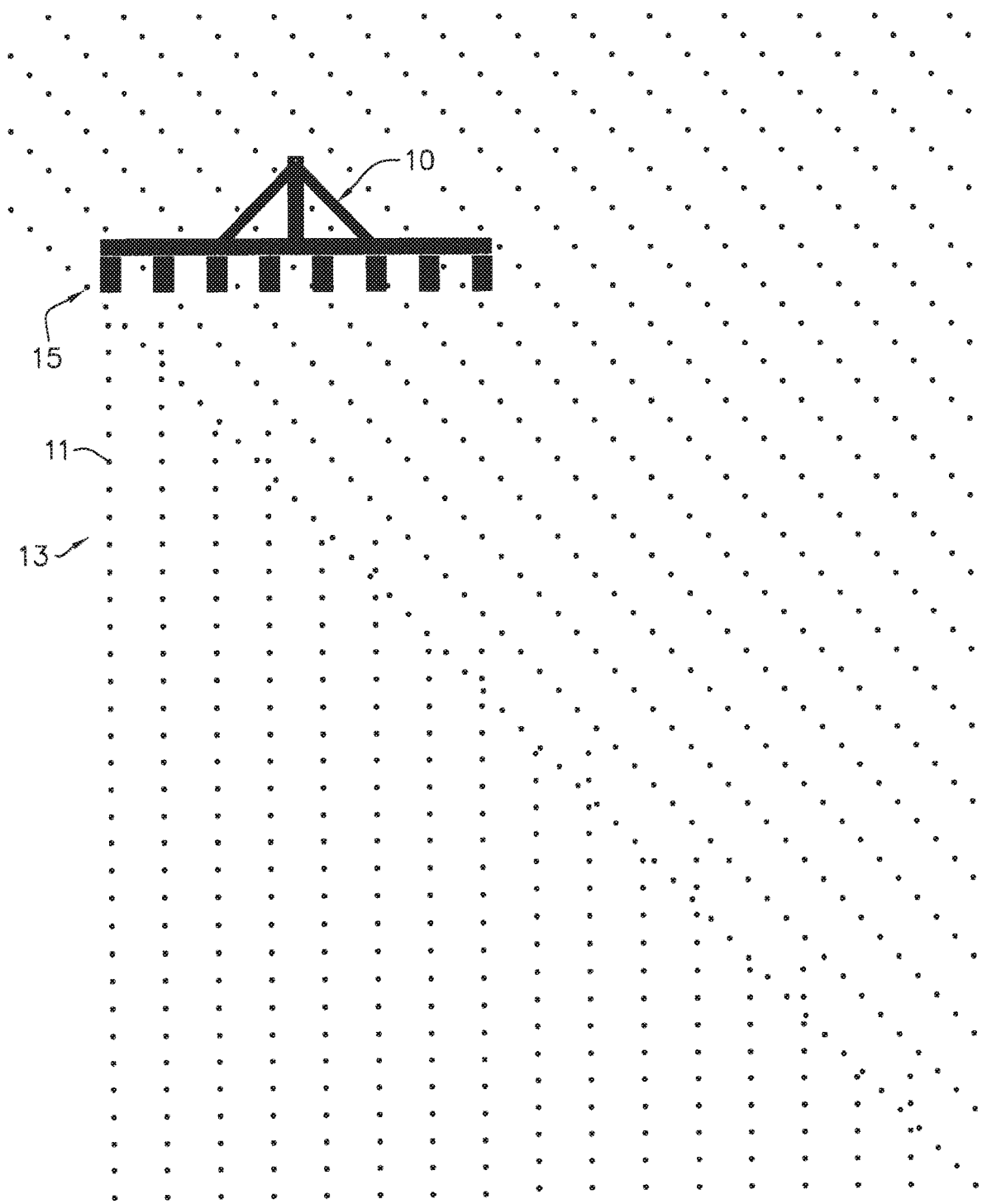
FIG. 5B shows an eight-row planter illustrating overplanting with a 2-row swath control system.
Figure 5C:
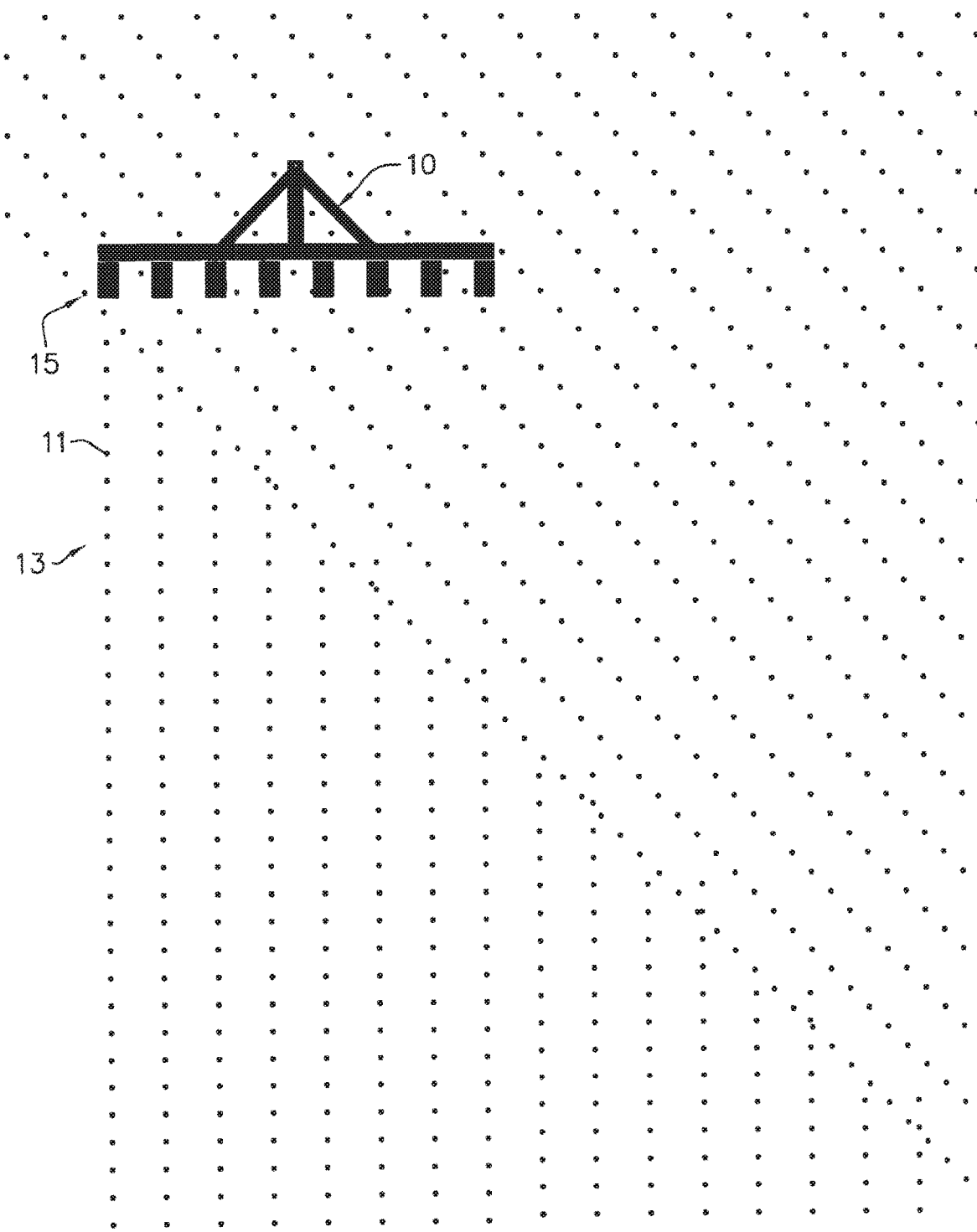
FIG. 5C shows an eight-row planter illustrating 50/50 overplanting-underplanting with a 2-row swath control system.

FIG. 4 shows an eight-row planter with swath control on every row of the planter (hereinafter a "1-row swath control"). FIGS. 5A-5C illustrate an eight-row planter with swath control for every two rows of the planter (hereinafter a "2-row swath control"). It should be appreciated that swath control may include any desired number of rows. Comparing FIGS. 1-3 with FIG. 4, one can clearly see that a 1-row swath control system will ideally plant a field with little or no overplanting or underplanting thereby minimizing wasted seed and unplanted areas resulting in improved yield, all other factors being equal. Similarly, comparing FIGS. 1-3 with FIGS. 5A, 5B and 5C, one can clearly see that a 2-row swath control system will ideally plant a field with only minimal overplanting or underplanting when compared to conventional planters without swath control.

Figure 6:
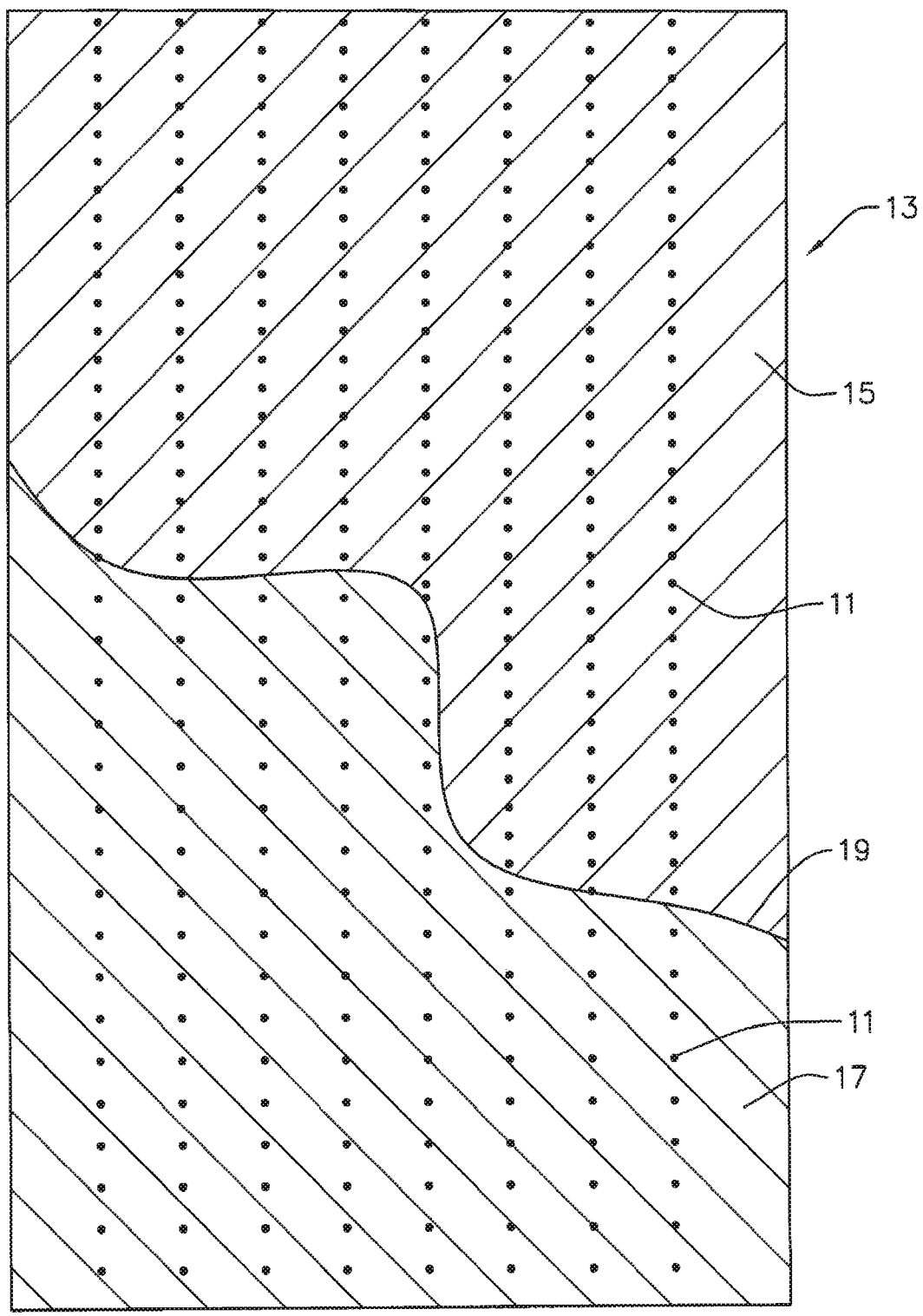
FIG. 6 shows a field with an inner boundary illustrating different seed populations planted using a VRS with 1-row swath control.

FIG. 6 shows a field 13 having two different soil types 15, 17 designated by different hatch patterns, separated by an inner boundary 19. The different soil types are shown planted with different seed populations (note different spacing of seeds 11 between the different soil types 15, 17) using a planter with VRS and 1-row swath control wherein as each row unit passed the inner boundary 19, the VRS was engaged to change the seed population to the different soil type.

It should be appreciated, however, that even if the planter is equipped with a swath control system, unless precise seed placement is known and unless the swath control system takes into account certain factors, significant overplanting and underplanting can still take place if these factors are not taken into consideration. These factors include planter speed, timing delays in starting and stopping of the seed meter, and timing delays between the seed being discharged from the seed meter until the seed passes through the seed tube and into the furrow, and other factors as discussed later. It should also be appreciated that overplanting and underplanting of rows can occur when entering or exiting different soil types with different desired seed populations if these same factors are not taken into account.

General Overview

Figure 7:
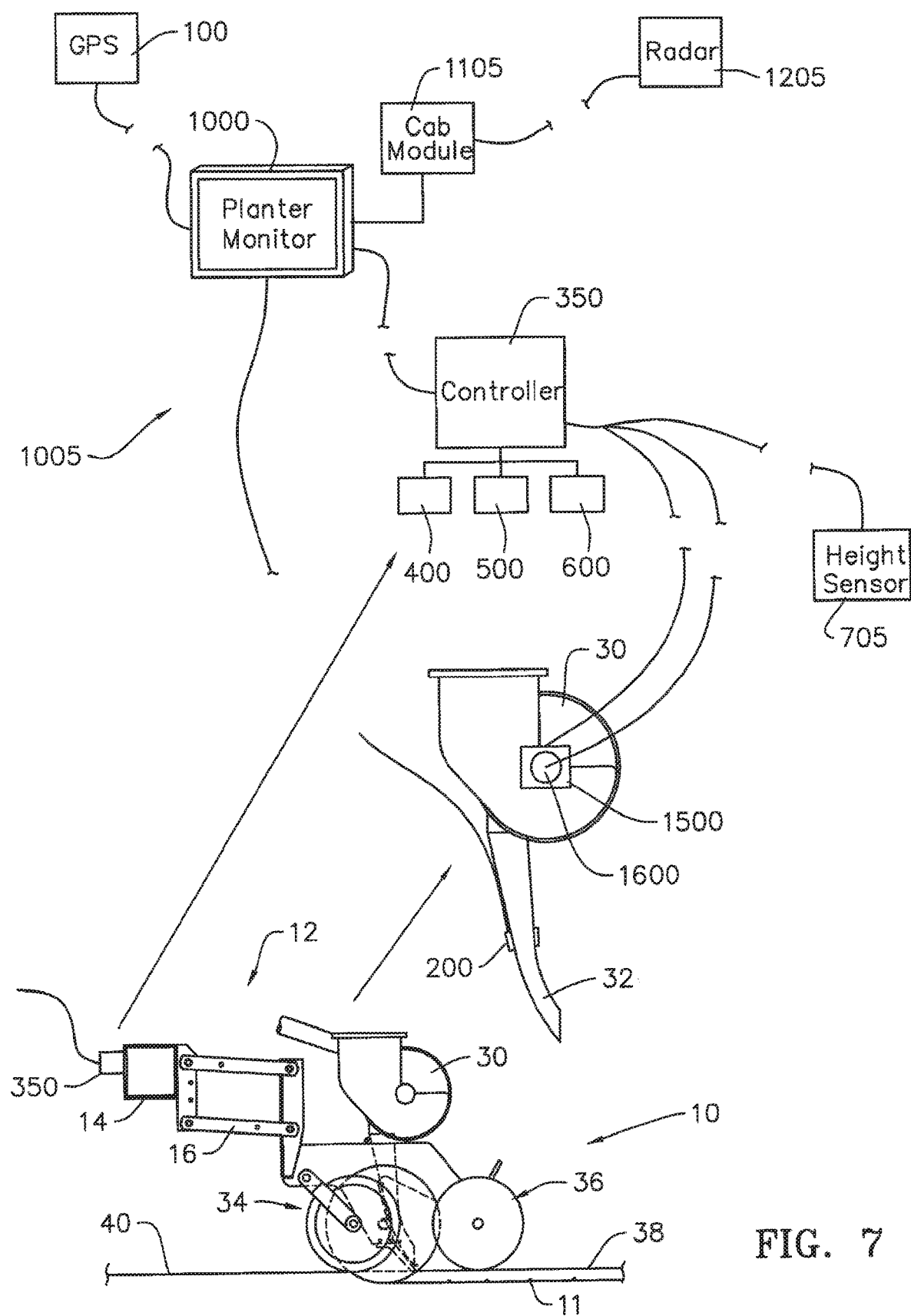
FIG. 7 is a schematic illustration of an embodiment of seeding control system.

FIG. 7 illustrates a seeding control system 1005 that cooperates with the row units 12 of a planter 10 to improve yield by taking the above-identified factors and other factors into consideration for precise mapping of seed placement in the field.

In FIG. 7, the row unit 12 is illustrated as a row unit for a central-fill planter such as disclosed in U.S. Pat. No. 7,438,006, incorporated herein in its entirety by reference, but it should be appreciated that the seeding control system 1005 may be used with more conventional row units such as disclosed in U.S. Pat. No. 4,009,668, also incorporated herein in its entirety by reference, or any other type of row unit for any make or model of a planter. The row units 12 are spaced along a toolbar 14 of the planter main frame. The planter main frame is attached to a tractor (not shown) in a conventional manner, such as by a drawbar or three-point hitch arrangement as is well known in the art. Ground wheel assemblies (not shown) support the main frame above the ground surface and are moveable relative to the main frame through actuation of the planter's hydraulic system (not shown) coupled to the tractor's hydraulics to raise and lower the planter main frame between a transport position and a planting position, respectively.

Each row unit 12 is preferably supported from the toolbar 14 by a parallel linkage 16 which permits each row unit 12 to move vertically independently of the toolbar 14 and the other spaced row units in order to accommodate changes in terrain or upon the row unit encountering a rock or other obstruction as the planter is drawn through the field. Each row unit 12 includes a seed meter 30, a seed tube or other seed path 32, a furrow opening assembly 34 and a furrow closing assembly 36. The furrow opening assembly cuts a furrow 38 into the soil surface 40 as the planter 10 is drawn through the field. A constant supply of seed 11 is communicated to the seed meter 30. The seed meter 30 discharges individual seeds 11 into the seed tube 32 at spaced intervals based on the seed population desired and the speed at which the planter is drawn through the field. The seed 11 drops from the end of the seed tube 32 into the furrow 38 formed by the furrow opening assembly 34. The seeds 11 are then covered with soil by the closing wheel assembly 36.

In operation, as each seed 11 passes through the seed tube 32, the seed sensor 200 sends a seed pulse to the planter monitor 1000. The planter monitor 1000 associates the time of the seed pulse with a location of the GPS unit 100 to determine the precise location of the planted seed within the field by taking into account the planter speed, seed population, offset distances, etc., all previously determined and calibrated during setup and calibration phases (discussed later) to generate a precise seed placement map. Based on the generated seed placement map, the planter monitor 1000 will determine if a "stop-planting" condition exists when a row unit or swath (i.e. one or more row units controlled by a swath controller 1500) of the planter 10 passes over a previously planted seed or when a row unit or swath travels across a headland, an outer boundary or an inner boundary of the field. If a stop-planting condition exists for a particular row unit or swath, a signal will be generated to disengage a clutch taking into account various factors such as planter speed, changes in acceleration, clutch delays, seed drop delays, etc., all previously determined and calibrated during the setup and calibration phases (discussed later) such that the corresponding seed meters cease dispensing seed at the appropriate time and to resume dispensing seed at the appropriate time after the "stop planting" condition has passes so as to ensure minimal overplanting or underplanting of the field.

Preferred Seeding Control System Components

The seeding control system 1005 preferably includes a GPS (global positioning system) unit 100, seed sensors 200, a control unit 350, and height sensors 705, a planter monitor 1000, a cab module 1105 and a radar system 1205 which cooperate to control a variable rate drives 1600 and swath controllers 1500 of the planter 10 to minimize overplanting and underplanting of fields.

The planter monitor 1000 is typically mounted in the tractor cab so it can be easily viewed and interfaced with by the operator while planting. A preferred planter monitor 1000 is the 20/20 SeedSense® from Precision Planting, Inc., 23207 Townline Road, Tremont, Ill. 61568 and as disclosed in published U.S. patent application Pub. No. US 2010/0010667, incorporated herein in its entirety by reference. The planter monitor preferably utilizes a touch screen graphic user interface (GUI) and includes microprocessor, memory and other applicable hardware and software for receiving, storing, processing, communicating, displaying and performing the various features and functionalities as hereinafter described (hereinafter, collectively, the "processing circuitry") as readily understood by those skilled in the art. The planter monitor 1000 is preferably configured to communicate with a data transfer device such as a USB flash drive, internet connection or any other data transfer means for input and retrieving seed population rates, field mapping information, etc. In addition, the planter monitor 1000 is in electrical communication (via wires or wirelessly) to receive input signals from the seed sensors 200, a GPS unit 100 and the cab module 1105.

Seed sensors 200 are mounted to the seed tubes 32 of the row units 12 to detect the passage of seed therethrough. A common seed sensor 200 is a photoelectric sensor, such as manufactured by Dickey-John Corporation, 5200 Dickey-John Road, Auburn, Ill. 62615. A typical photoelectric sensor generally includes a light source element and a light receiving element disposed over apertures in the forward and rearward walls of the seed tube. In operation, whenever a seed passes between the light source and the light receiver, the passing seed interrupts the light beam causing the sensor 200 to generate a seed pulse or electrical signal indicating the detection of the passing of a seed. It should be appreciated that any type of seed sensor capable of producing an electrical signal to designate the passing of a seed may be used.

The GPS unit 100 is configured to receive a GPS signal, comprises a series of GPS data strings, from a satellite (not shown). The GPS signal is communicated to the planter monitor 1000. A preferred GPS unit 100 is a Deluo PMB-288 available from Deluo, LLC, 10084 NW 53rd Street, Sunrise, Fla. 33351, or other suitable device. The GPS unit 100, is used to monitor the speed and the distances traveled by the planter 10. As will be discussed in more detail later, preferably the output of the GPS unit 100, including the planter speed and distances traveled by the planter, is communicated to the planter monitor 1000 for display to the planter operator and/or for use in various algorithms for deriving relevant data used in connection with the preferred system and method of the present invention. In alternative embodiments, the GPS unit 100 comprises a positioning system configured to use the signals of other satellite systems such as GLONASS or Galileo. In still other embodiments, the GPS unit 100 may comprise any other positioning system configured to determine the latitudinal and longitudinal position of the planter 10.

In addition to a GPS unit, the seeding control system 1005 preferably includes a radar system 1205 to determine a speed of the planter 10 because empirical data has shown that data from the GPS unit 100 is delayed and untrustworthy at speeds lower than approximately one mile per hour (1 mph). Empirical data has also shown that the GPS unit 100 will indicate speeds of 0.1 or 0.2 mph when the planter 10 is actually stopped. For these reasons, speed inputs provided by GPS systems alone are non-ideal for accurately determining when a planter 10 has stopped or for predicting when the planter will stop (for reasons discussed later) or when determining if the planter 10 has resumed travel. The radar system 1205 is placed in a fixed location and sends a radar signal to the cab module 1105 which in turn communicates the radar signal to the planter monitor 1000 for displaying the planter speed.

The cab module 1105 is preferably mounted in the tractor cab such that it too can be easily viewed and interfaced with by the operator while planting. The cab module 1105 preferably includes switches configured to allow the operator to turn the variable rate drives 1600 on and off and to selectively engage and disengage the swath controllers 1500 during pre-planting calibration routines (discussed later). The cab module 1105 also communication with the radar system 1205 and includes processing circuitry configured to determine whether the radar-reported speed is stable for reasons discussed later.

The height sensors 705 may comprise a contact switch configured to close or open a circuit when the gauge wheel arms of the furrow opening assembly 34 are no longer in contact with the gauge wheel arm stop indicating that the planter is in a transport position or otherwise raised above the soil. In other embodiments, the height sensor 705 may also comprise any sensor mounted to a location on the planter 10 that determines the height of said location relative to the soil surface 40 for purposes of indicating that the row unit is in a transport position or otherwise raised above the soil.

The control unit 350 preferably includes an inclinometer 600, vertical accelerometer 500, a horizontal accelerometer 400 and appropriate processing circuitry all physically integrated into a single unit that is preferably mounted to the toolbar 14 of the planter 10, but which may be mounted in other suitable location and in any orientation appropriate to measure the horizontal acceleration, vertical acceleration, and inclination of the tractor and/or toolbar 14. The control unit 350 is in electrical communication (via wires or wirelessly) with the swath control 1500, the variable rate drives 1600, the height sensors 705 and the cab module 1105. More than one control unit 350 may be utilized.

Setup

In a setup phase, the operator is preferably able to select the tractor make and model and the planter make and model preferably through drop down selection menus. The geometry of the various tractor and planter makes and models are preferably stored in memory to make the setup phase quicker and easier so the operator does not have to physically measure each of the various distances discussed below for modeling the geometry of the planter and the offset distances to the GPS unit 100. The seeding control system 1005 uses these distances to determine the location of each seed sensor 200 based on a location of the GPS unit 100. The following method and illustrations assume that the GPS unit 100 is mounted on the tractor cab, although it should be appreciated that other mounting locations (such as the planter 10 itself) are possible.

Figure 8:
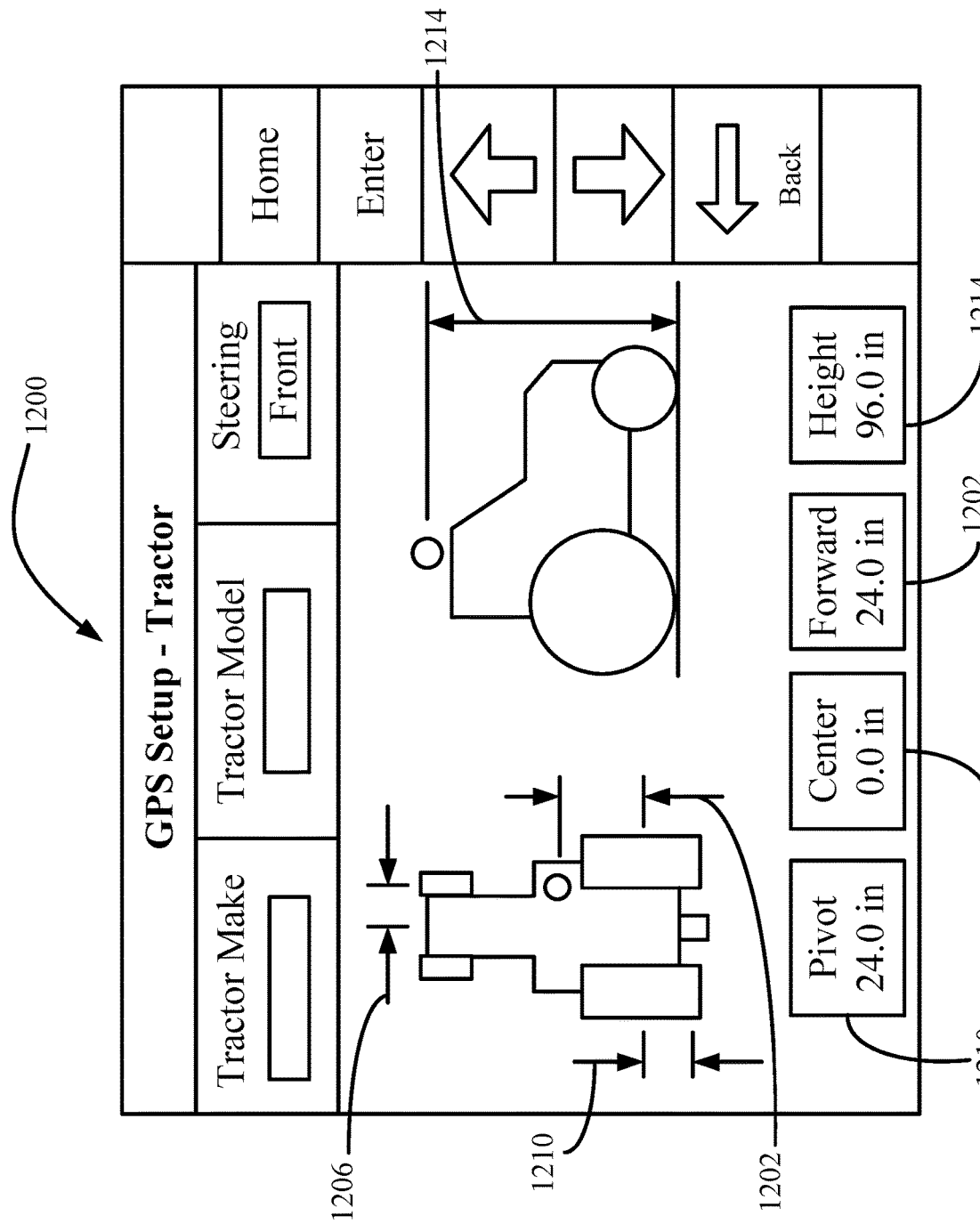
FIG. 8 illustrates an embodiment of a monitor screen for entering GP S offsets with respect to a tractor.

FIG. 8 illustrates an embodiment of a setup screen 1200 displayed by the planter monitor 1000 for entering GPS offsets with respect to the tractor. As illustrated in screen 1200 the offset distances include the distance 1202 from the GPS unit 100 to the centerline of the rear wheels of tractor, a distance 1206 to the centerline of the tractor, a distance 1210 from the centerline of the rear wheels of the tractor to the pivot of the tractor, and a distance 1214 to the ground. It should be appreciated that although the other distances entered in the setup phase as described herein are used to establish the location of the seed tube exit, the distance 1202 to the centerline of the rear wheels of the tractor is used to model the location of the planter 10 while raised in a transport position behind the tractor.

Figure 9:
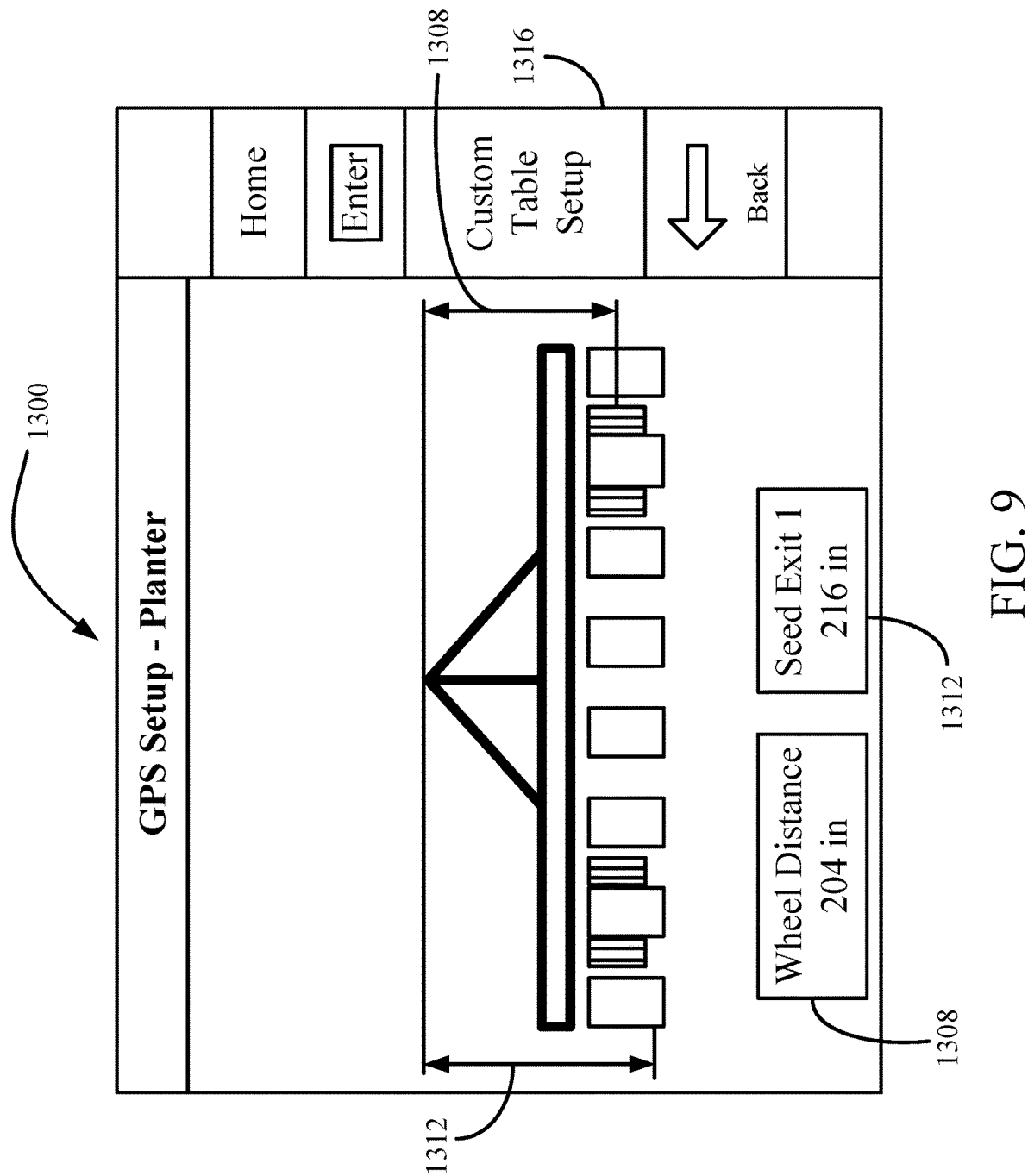
FIG. 9 illustrates an embodiment of a monitor screen for entering offsets with respect to a pivot axis of a planter.

FIG. 9 illustrates an embodiment of another setup screen 1300 displayed by the planter monitor 1000 for entering locations on the planter 10 with respect to the planter pivot point. In addition to selecting a make and model, the operator may be prompted to select the planter frame type and/or hitch style, such as drawn, 2-point pivot, and 3-point. The planter monitor 1000 preferably displays an image 1306 representing the geometry of the selected planter frame type and/or hitch style and prompts the operator to enter distances needed to model the planter geometry. In the illustrative example of FIG. 9, the planter monitor 1000 requires the operator to enter the distance 1308 between the pivot and the centerline of the gauge wheels 48 as well as the distance 1312 between the pivot and the seed exit. Other frame types and hitch styles will require the operator to measure and input additional or different distances. The planter monitor 1000 assumes transverse distances from the seed exits of each of the row units to the centerline of the tractor based on the planter make and model previously entered by the operator. Alternatively, the operator selects the custom table setup window 1316 and enters transverse distances 1318 from each seed exit to the centerline of the planter 10.

Figure 10A:
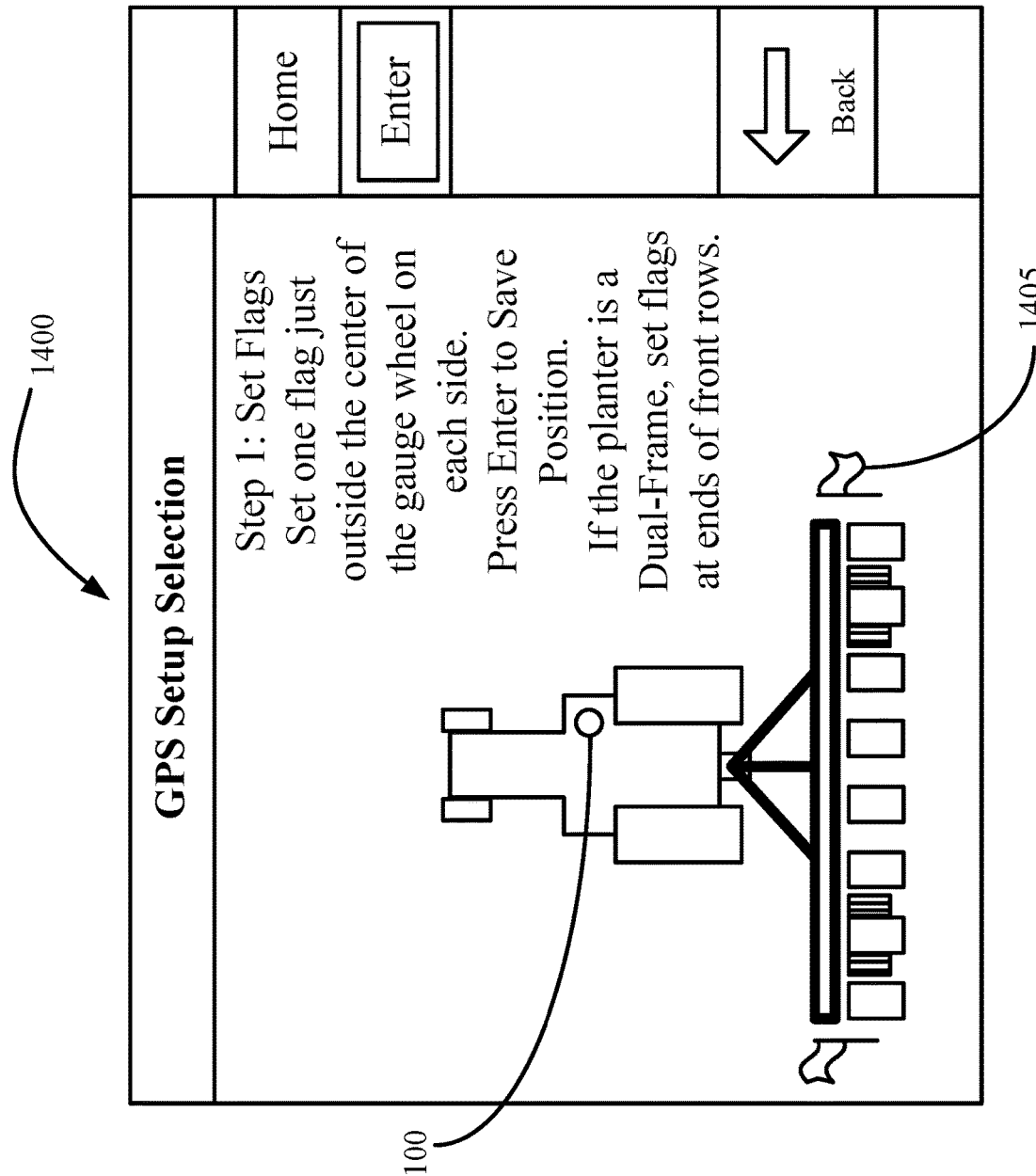
FIG. 10A illustrates an embodiment of a monitor screen for beginning a GP S offset verification routine.
Figure 10B:
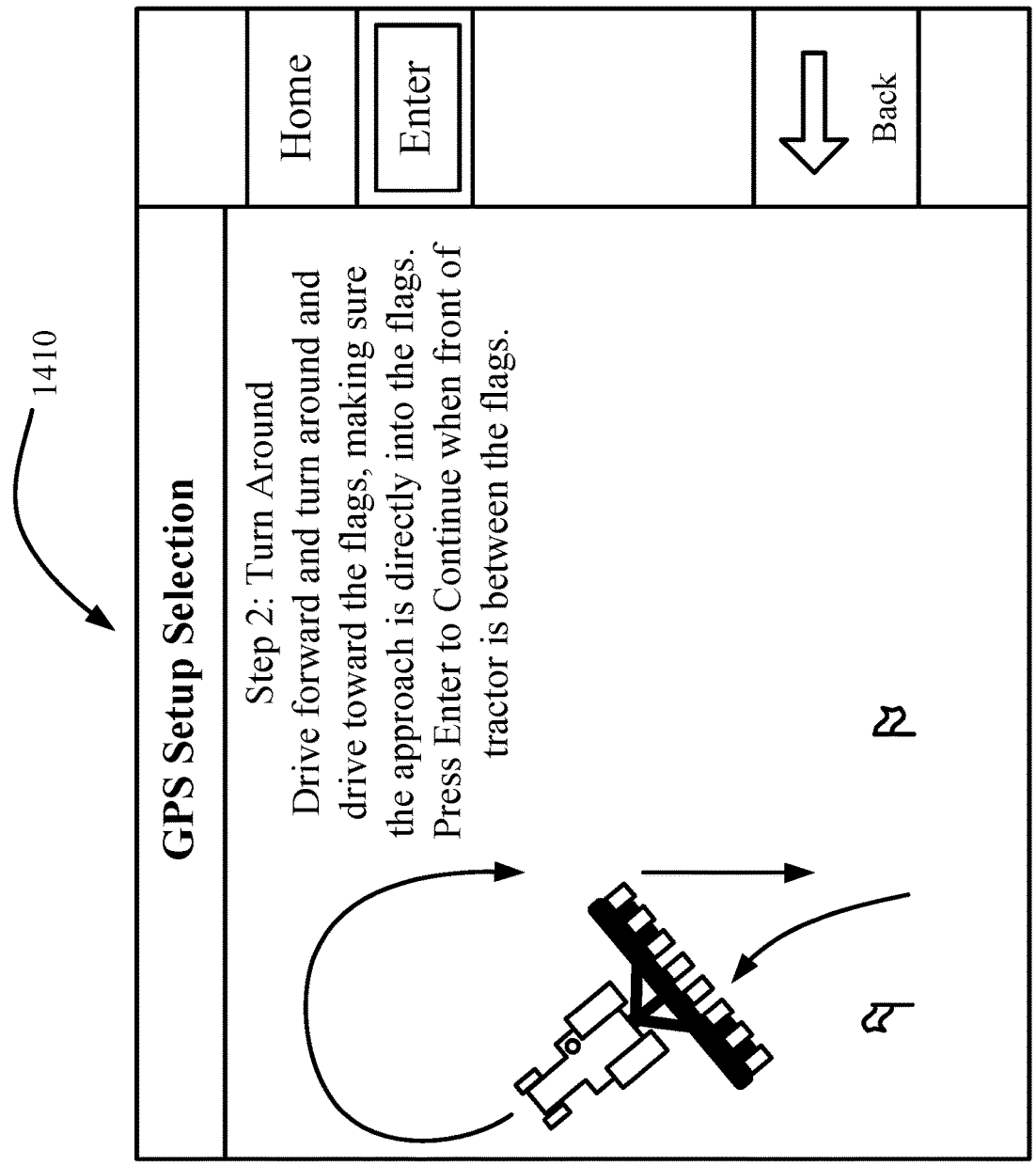
FIG. 10B illustrates an embodiment of a monitor screen for continuing a GPS offset verification routine.
Figure 10C:
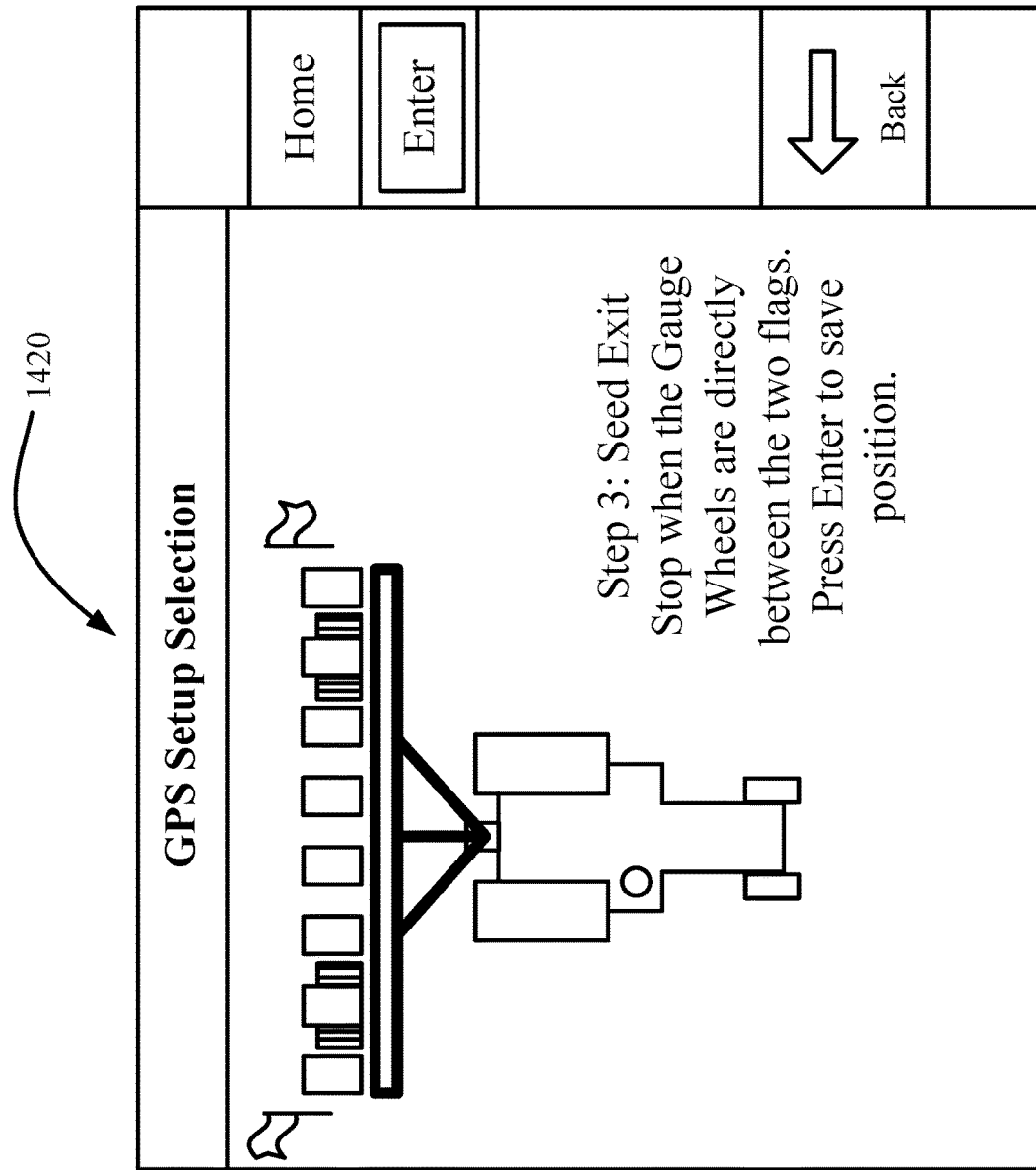
FIG. 10C illustrates an embodiment of a monitor screen for completing a GPS offset verification routine.

As part of the initial setup, the operator is preferably prompted to perform a verification routine to verify the GPS offsets entered in the previous setup screens 1200 and 1300. FIG. 10A illustrates another embodiment of a setup screen 1400 prompting the operator to place flags 1405 next to the gauge wheels 48 of the rightmost and leftmost row units of the planter 10. When the operator indicates that the planter 10 is in place, the planter monitor 1000 records a first test location of the GPS unit 100. FIGS. 10B and 10C illustrate embodiments of subsequent setup screens 1410 and 1420 prompting the operator to turn the planter 10 around such that the flags 1405 are adjacent to the gauge wheels 48 on the opposite sides of the planter 10. When the operator indicates that the planter 10 is in place, the planter monitor records a second test location of the GPS unit 100.

Figure 10D:
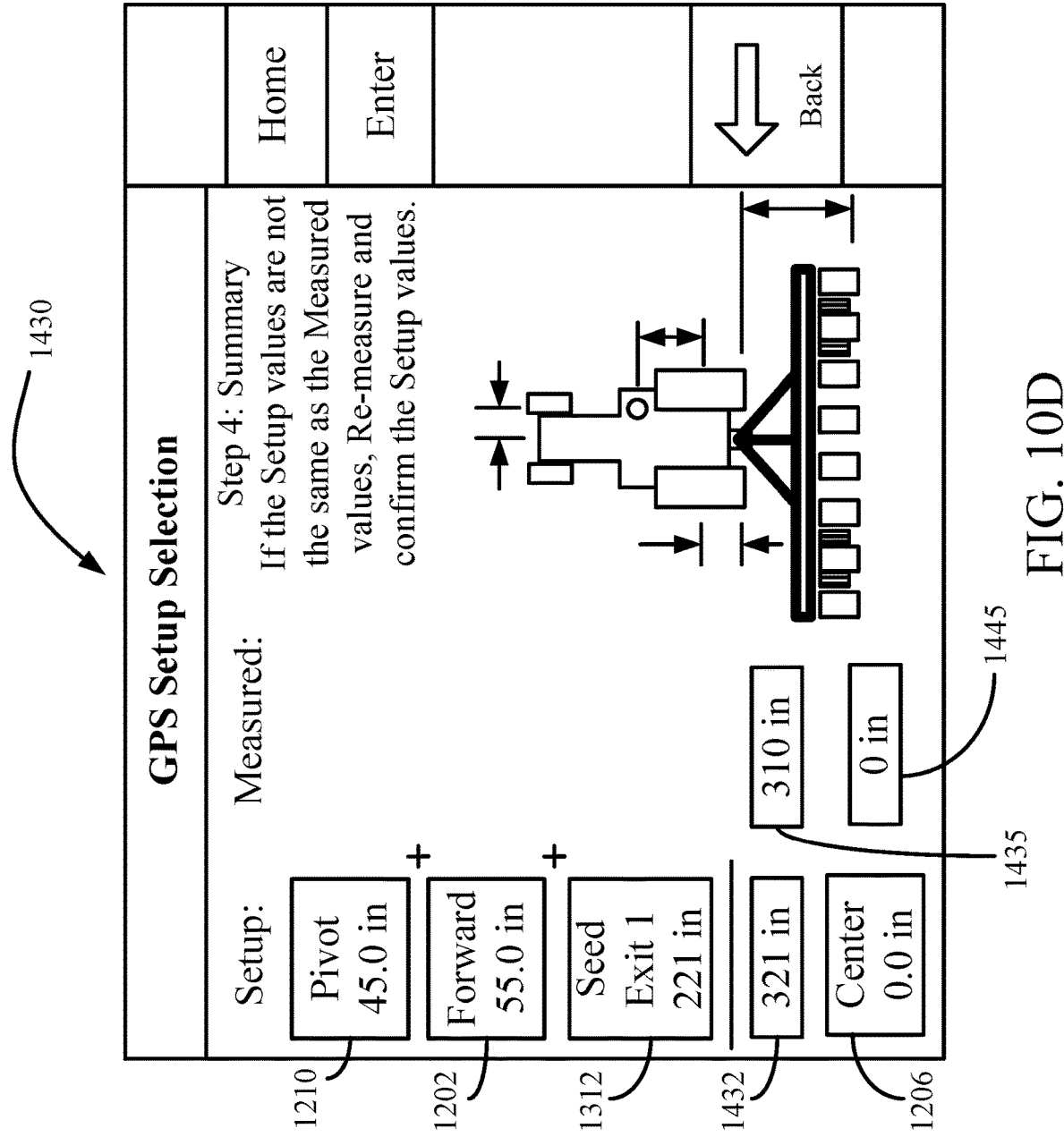
FIG. 10D illustrates an embodiment of a monitor screen for displaying measured and operator-entered GPS offsets.

In yet another embodiment of a setup screen 1430 as illustrated in FIG. 10D, the sum 1432 of the distances 1202, 1210, and 1308 previously entered by the operator is calculated. The measured distance 1435 from the GPS unit 100 to the planter gauge wheels is also determined by dividing the distance along the direction of travel between the first test location and the second test location by two. The operator is prompted to re-measure the previously entered GPS offsets if the measured distance 1435 is different from the sum 1432. Likewise, the distance 1206 previously entered by the operator is displayed. The measured distance 1445 corresponding to the distance 1206 is determined by dividing the transverse distance between the first test location and the second test location by two. The operator is prompted to re-measure the previously entered GPS offsets if the measured distance is different from the distance 1206 previously entered by the operator.

Figure 11:
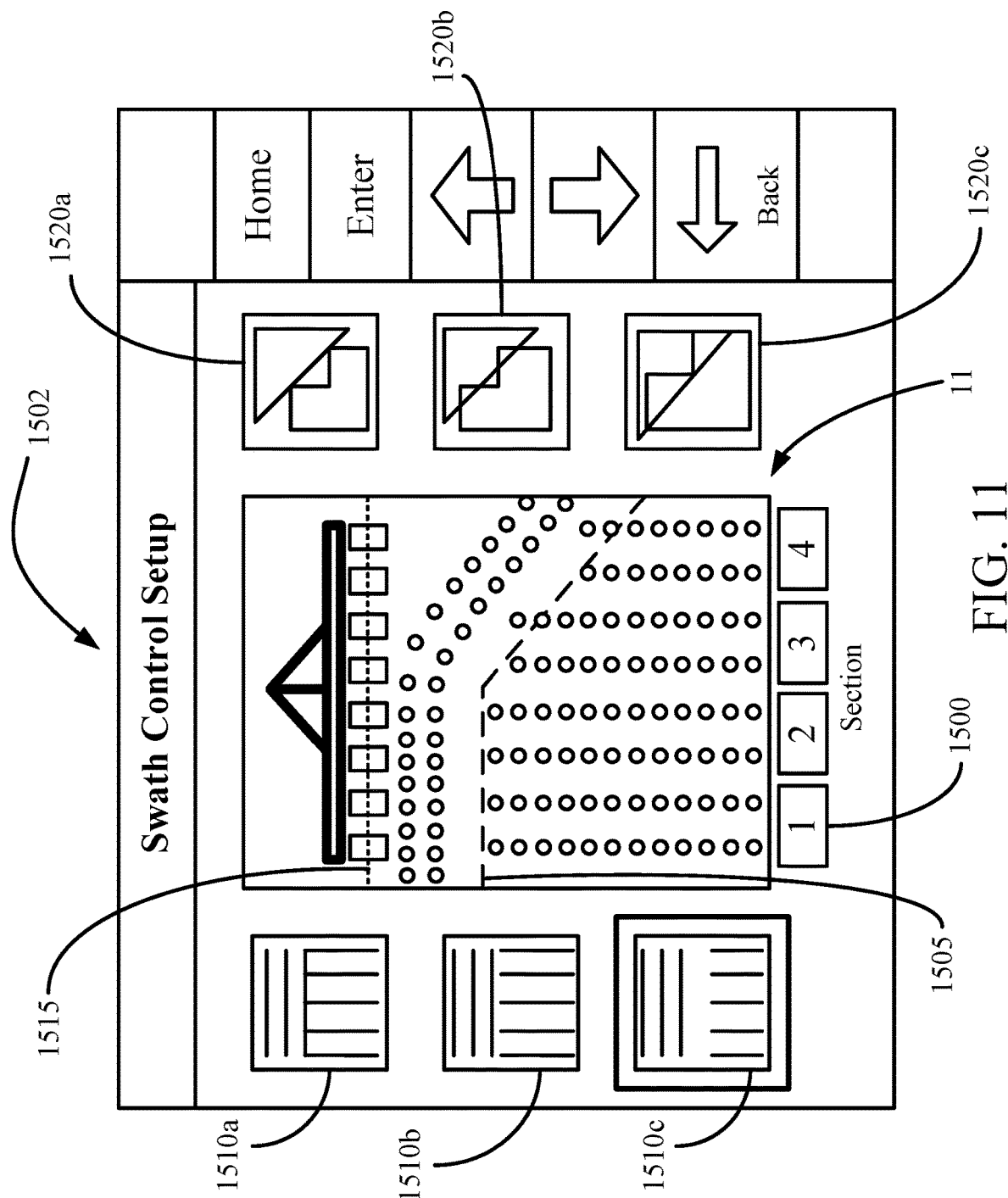
FIG. 11 illustrates an embodiment of a monitor screen for configuring swath controllers by selecting a coverage pattern.

As illustrated in a further setup screen 1502, the operator configures the planter swath control. The operator enters the number of swath controllers 1500 and the number of row units controlled by each swath controller. The operator is preferably able to choose a coverage pattern. In the illustrative embodiment of FIG. 11, the illustrated planter 10 has four swath controllers 1500 each controlling two row units. The operator selects windows 1510a, 15106, or 1510c to choose whether the swath controllers 1500 encounter a stop-planting boundary 1505 at the previously planted seed, at a half-row offset from the previously planted seed, or at full row offset from the previously planted seed, respectively. In the illustrative example of FIG. 11, the operator has selected a full row offset (1510c). The operator selects windows 1520a, 1520b, or 1520c to choose whether the swath controllers are to stop planting when any row of the swath controller crosses the stop-planting boundary 1505 ("Under-Plant"), when any row along transverse line 1515 of the planter crosses the stop-planting boundary 1505 ("50%-50%"), or when every row controlled by the swath controller has crossed the stop-planting boundary 1505 ("Over-Plant"), respectively. In the illustrative example of FIG. 11, the operator has selected 50%-50% (1520b).

In a further setup phase, the operator configures the variable rate drives 1600. The operator indicates which rows are driven by each variable rate drive 1600. The operator enters the number of encoder pulses per rotation (discussed later) and the encoder pulse signal frequency (discussed later) of each variable rate drive 1600. Alternatively, the operator selects a make or type of variable rate drive 1600 which is associated with the same pulse and frequency characteristics.

Continuing the setup phase, the operator is further prompted to enter the number of seeds per disk on the seed meters 30 driven by each variable rate drive 1600. The operator further initiates a calibration routine (discussed later) in which the seeding control system 1005 drives the seed meters 30 and determines a drive ratio between the variable rate drives 1600 and the seed meters 30. Alternatively, the operator enters a drive ratio. In addition, the operator prescribes a default seed population rate to be used by the variable rate drive 1600 if the seeding control system 1005 loses the signal from the GPS unit 100.

The operator further configures the radar system 1205 in a test run. The operator drives the tractor and the planter monitor 1000 receives radar pulses from the radar system 1205. The planter monitor 1000 determines how far the tractor has traveled using the signal from the GPS unit 100. The planter monitor 1000 then determines how many radar pulses are received per unit distance traveled. The operator further selects whether the GPS unit 100 or the radar system 1205 is the primary or most trusted speed source used by the planter monitor 1000. As described later under "Operation," the planter monitor 1000 will determine whether to override the operator's choice of primary speed source based on the planter acceleration.

Figure 19A:
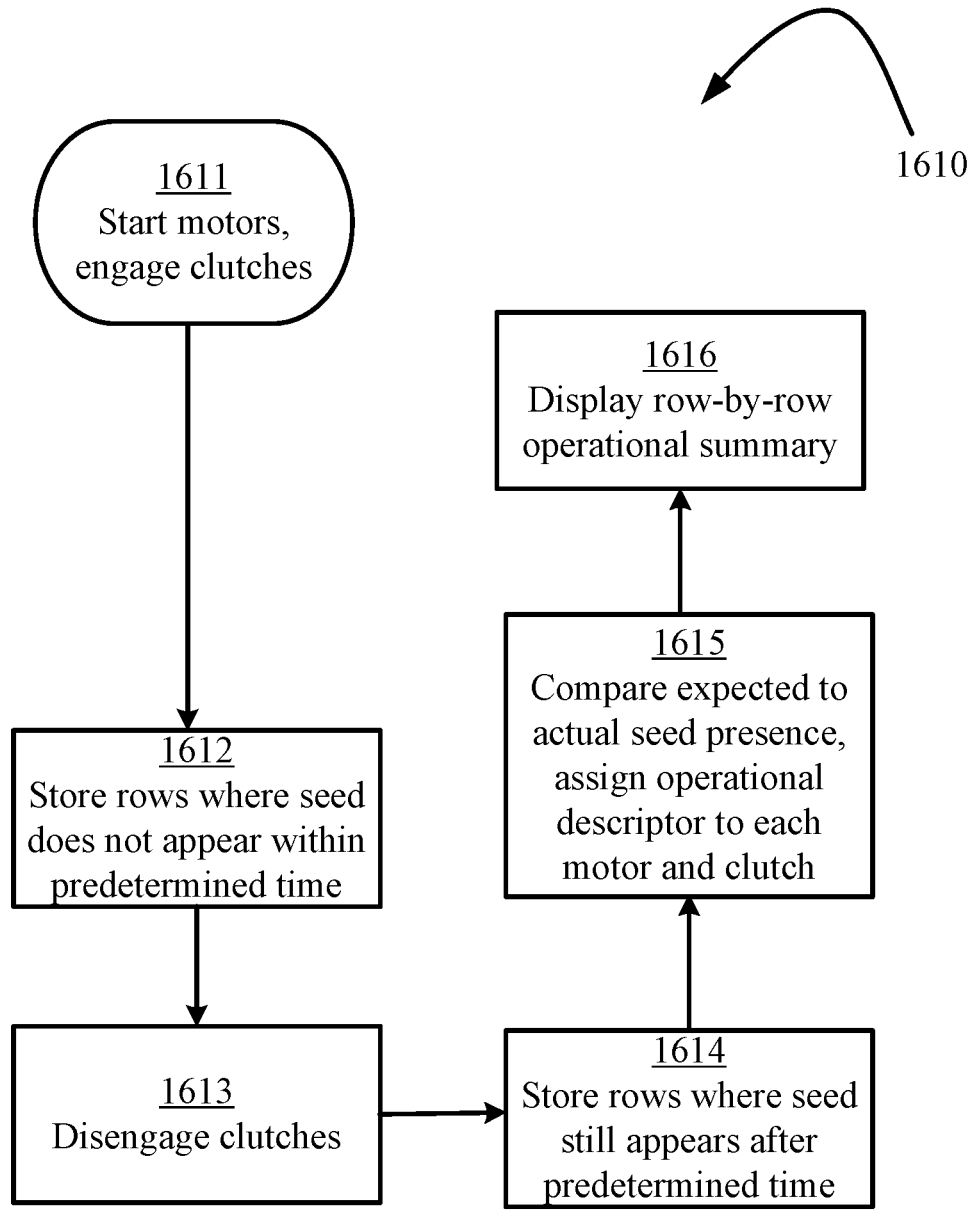
FIG. 19A is a schematic illustration of an embodiment of a method of identifying an operational problem with a seeding control system.
Figure 19B:
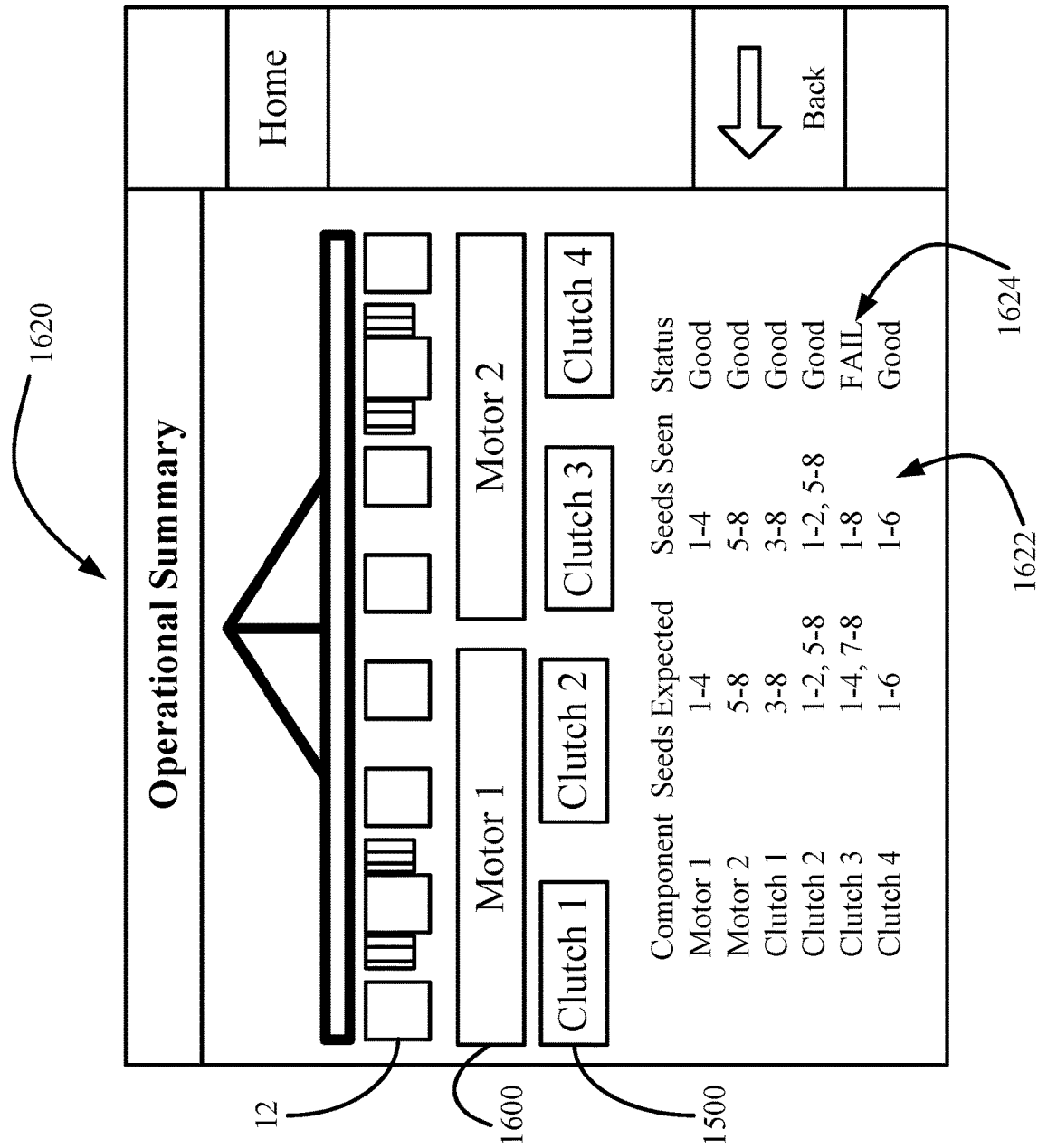
FIG. 19B illustrates an embodiment of a monitor screen for displaying an operational summary of a seeding control system.

Turning to FIG. 19A, in a further setup phase the seeding control system 1005 is preferably configured to run a process 1610 to identify an operational problem with the variable rate drives 1600 or swath controllers 1500. When the process is initiated by the operator at block 1611, the control unit 350 preferably starts one or more variable rate drives 1600 and engages one or more swath controllers 1500 to drive the seed meters. After a predetermined time period (e.g., 5 seconds) has passed at block 1612, the control unit 350 stores the subset of rows 12 at which seed pulses are not observed. Preferably, the control unit 350 then disengages one or more swath controllers 1500 at block 1613 and stores the subset of rows 12 at which the seed pulses are observed after a predetermined time at block 1614. At block 1615, the control unit 350 compares expected to actual presence of seeds for each tested configuration and assigns an operational descriptor (e.g., "Good" or "Failed") to each swath controller 1500 and variable rate drive 1600. At block 1616, the planter monitor 1000 preferably displays an operational summary indicating whether components (e.g., swath controllers 1500 or variable rate drives 1600) are working properly. Turning to FIG. 19B, the operational summary may comprise a screen 1620 including a result summary 1622 of expected and actual observation of seed pulses for each component tested, and preferably includes an alarm indicator 1624 alerting the operator that a component associated with the indicator has failed.

In other embodiments, the control unit 350 may be configured to engage or disengage each variable rate drive and swath controller in series (e.g., from right to left) during a setup phase, allowing the operator to determine by sight or sound whether each component is operating properly.

Calibration

The seeding control system 1005 is preferably configured to use the seed pulses generated by the seed sensors 200 to calibrate the swath controllers 1500 and variable rate drives 1600. The calibration routines described herein measure a delay between a control signal and an operational change detected by the seed sensors 200. The operational change may include changing the rate of seed delivery, stopping seed delivery or starting seed delivery. It should be appreciated, however, that a delay associated with any operational change involving seed delivery could be measured according to the calibration routines described herein.

Calibrating Stop Delay of a Variable Rate Drive

Figure 12:
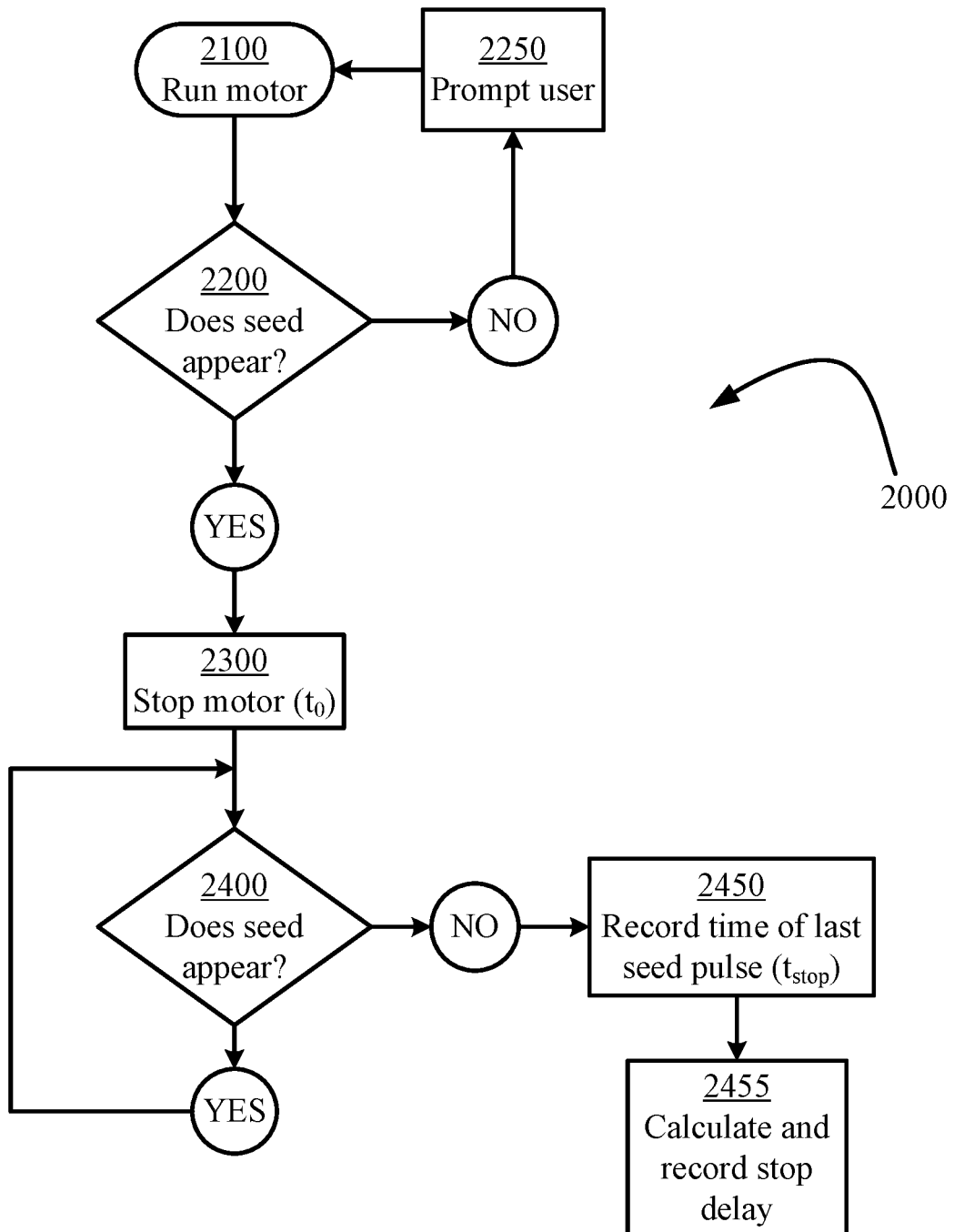
FIG. 12 is a schematic illustration of an embodiment of a method of determining a variable rate drive stop delay.

FIG. 12 illustrates an embodiment of a process 2000 to calibrate the variable rate drives 1600. At block 2100, the control unit 350 instructs the variable rate drive 1600 to run. At block 2200, if the control unit 350 does not receive a seed pulse within any predefined time interval, then at block 2250, the planter monitor 1000 prompts the operator to check the seed hopper for seeds 11 or otherwise correct the operation of the planter 10 such that seeds 11 will begin being discharged by the seed meter 30 through the seed tube 32. If the control unit 350 receives a seed pulse, then at block 2300, after a predefined time, the control unit 350 instructs the variable rate drive 1600 to stop driving the seed meter 30 at a time to. Time to is stored by the control unit 350. The control unit 350 then receives seed pulses at block 2400 until no seed pulse is received for a predetermined time (e.g., 5 seconds). At block 2450, the control unit then records the time of the last seed pulse ($t_{stop}$). The difference between $t_{stop}$ and to represents a stop delay associated with the variable rate drive 1600, which stop delay is calculated and stored by the control unit 350 at block 2455.

Calibrating Start Delay of a Variable Rate Drive

Figure 13A:
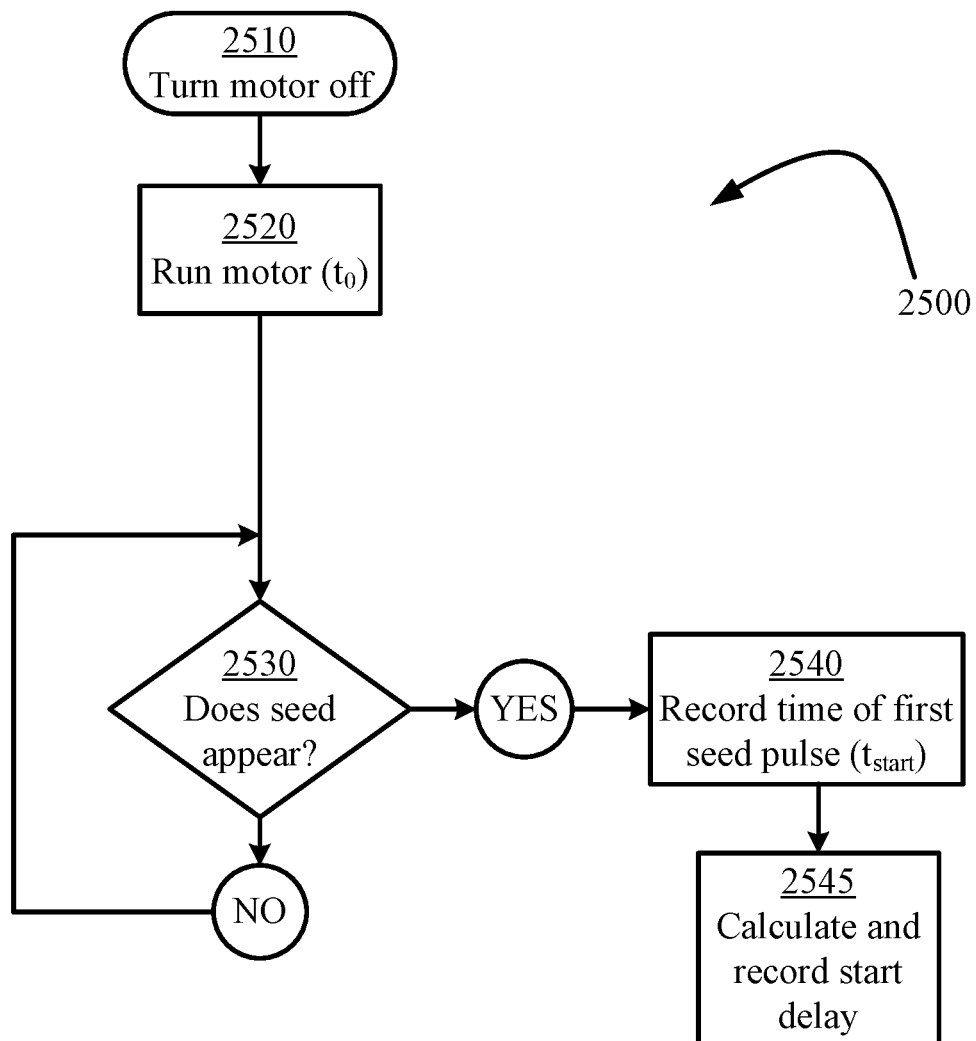
FIG. 13A is a schematic illustration of an embodiment of a method of determining a variable rate drive start delay.

FIG. 13A illustrates an embodiment of a process 2500 to calibrate the variable rate drives 1600. At block 2510, the control unit 350 instructs the variable rate drive 1600 to stop. At block 2520, after a predetermined time, the control unit 350 instructs the variable rate drive 1600 to start driving the seed meter 30 at a time to. Time to is stored by the control unit 350. If a seed pulse is received by the control unit 350 at block 2530, then the control unit records the time of the first seed pulse ($t_{start}$) at block 2540. The difference between $t_{start}$ and to represents a start delay associated with the variable rate drive 1600, which start delay is calculated and stored by the control unit 350 at block 2545.

With the start delay and stop delay calibrated, the control unit 350 preferably uses the start delay and stop delay to adjust the time at which the control unit 350 sends control signals to the variable rate drives 1600 such that seed begins to dispense or stops dispensing at the desired position in the field.

Figure 13B:
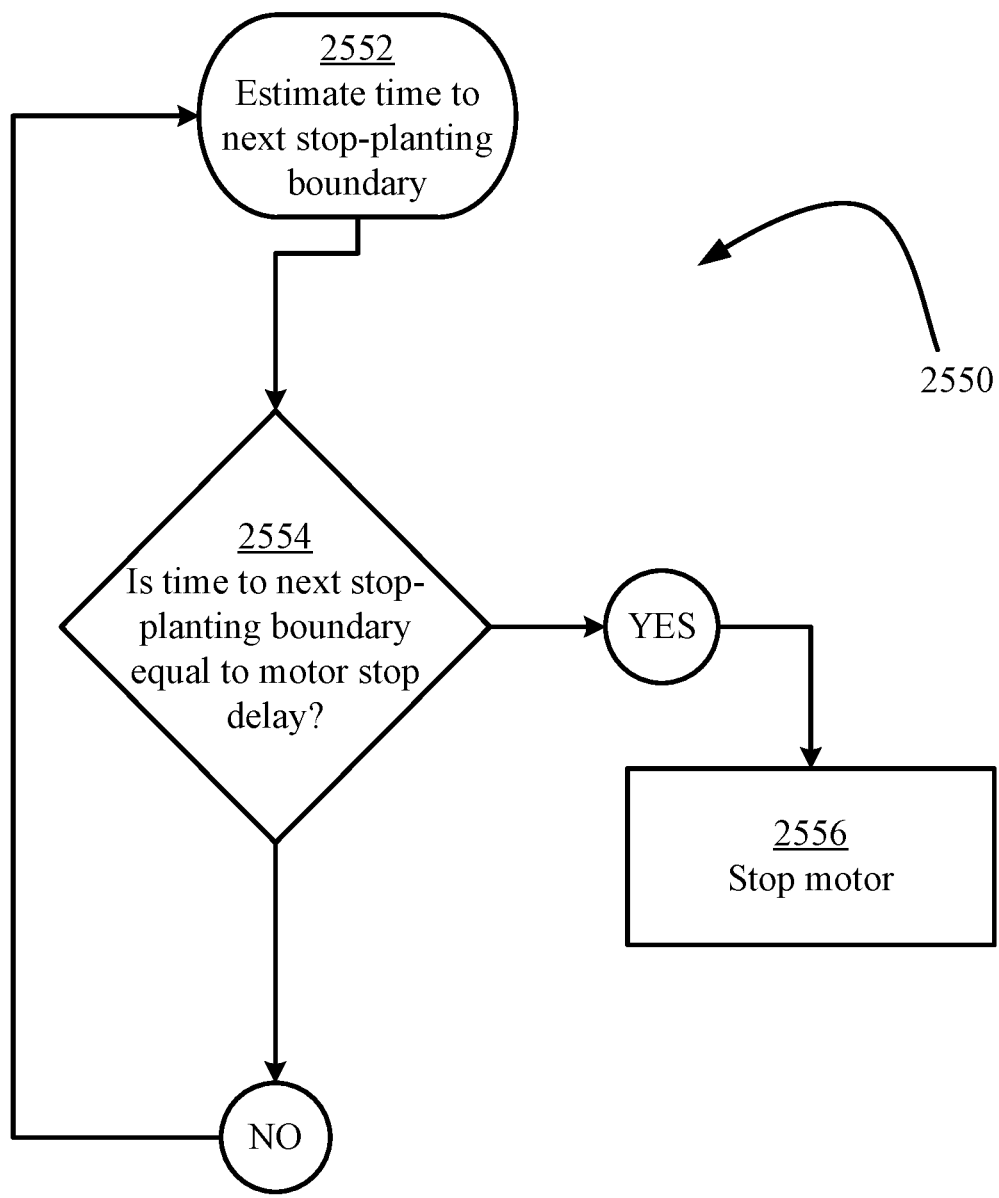
FIG. 13B is a schematic illustration of an embodiment of a method of stopping a variable rate drive based on a variable rate drive stop delay.

According to a preferred process 2550 illustrated in FIG. 13B, the control unit 350 estimates the time to the next stop-planting boundary at block 2552 (preferably using the current planter speed and the distance to the boundary) and compares said time to the motor stop delay at block 2554. If the time to the next stop-planting boundary is equal to the motor stop delay, then the control unit 350 preferably stops the motor at block 2556.

Figure 13C:
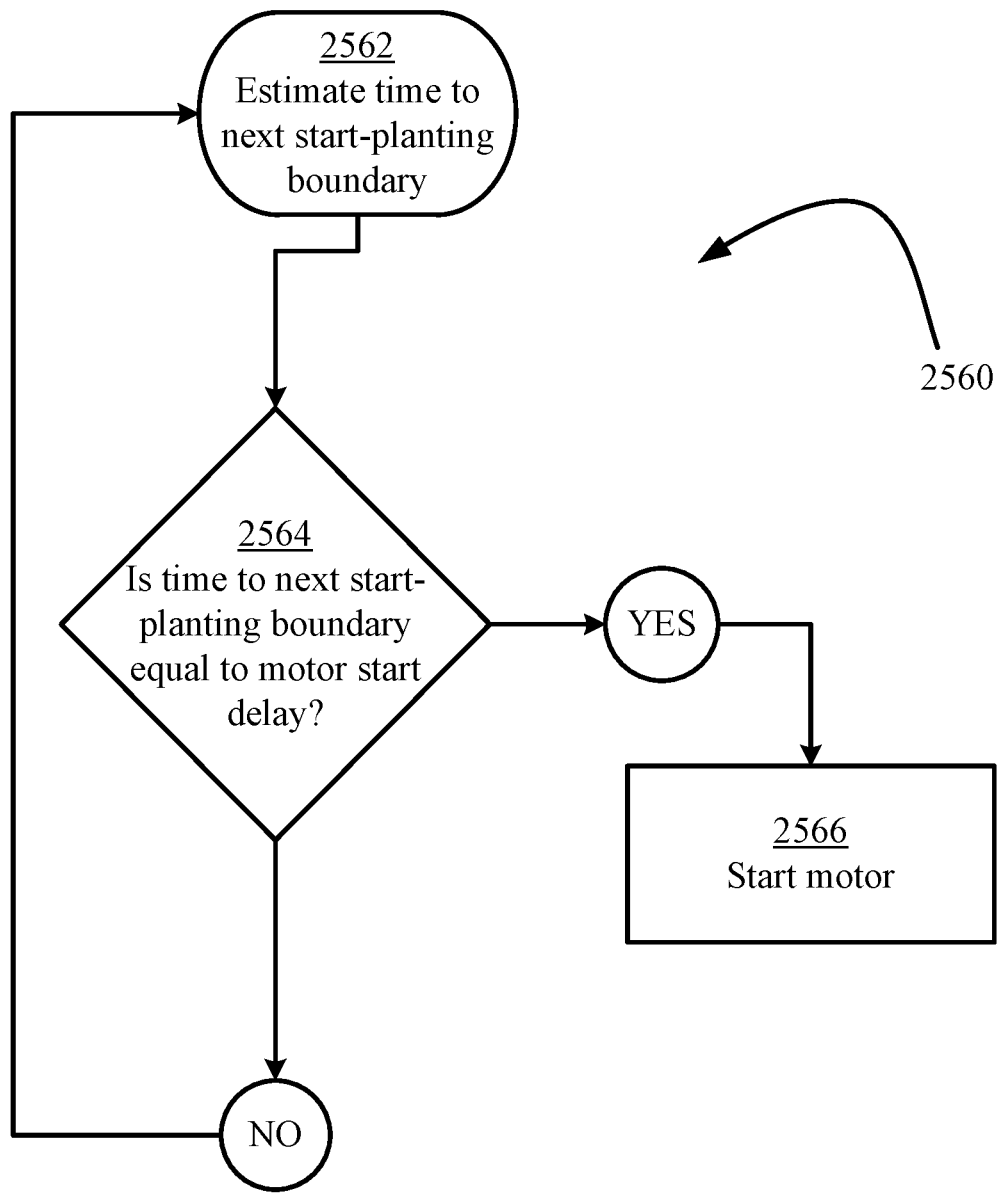
FIG. 13C is a schematic illustration of an embodiment of a method of starting a variable rate drive based on a variable rate drive start delay.

According to a preferred process 2560 illustrated in FIG. 13C, the control unit 350 estimates the time to the next start-planting boundary at block 2562 (preferably using the current planter speed and the distance to the boundary) and compares said time to the motor stop delay at block 2564. If the time to the next start-planting boundary is equal to the motor stop delay, then the control unit 350 preferably starts the motor at block 2566.

Thus the control unit 350 times the subsequent control signals based on the various delays measured as described herein. The above calibration process may be performed during in-field operation in order to determine the start delay and stop delay of the variable rate drives under current or near-current operating conditions.

Calibrating Drive Ratio Between Seed Meter and Variable Rate Drive

Figure 14:
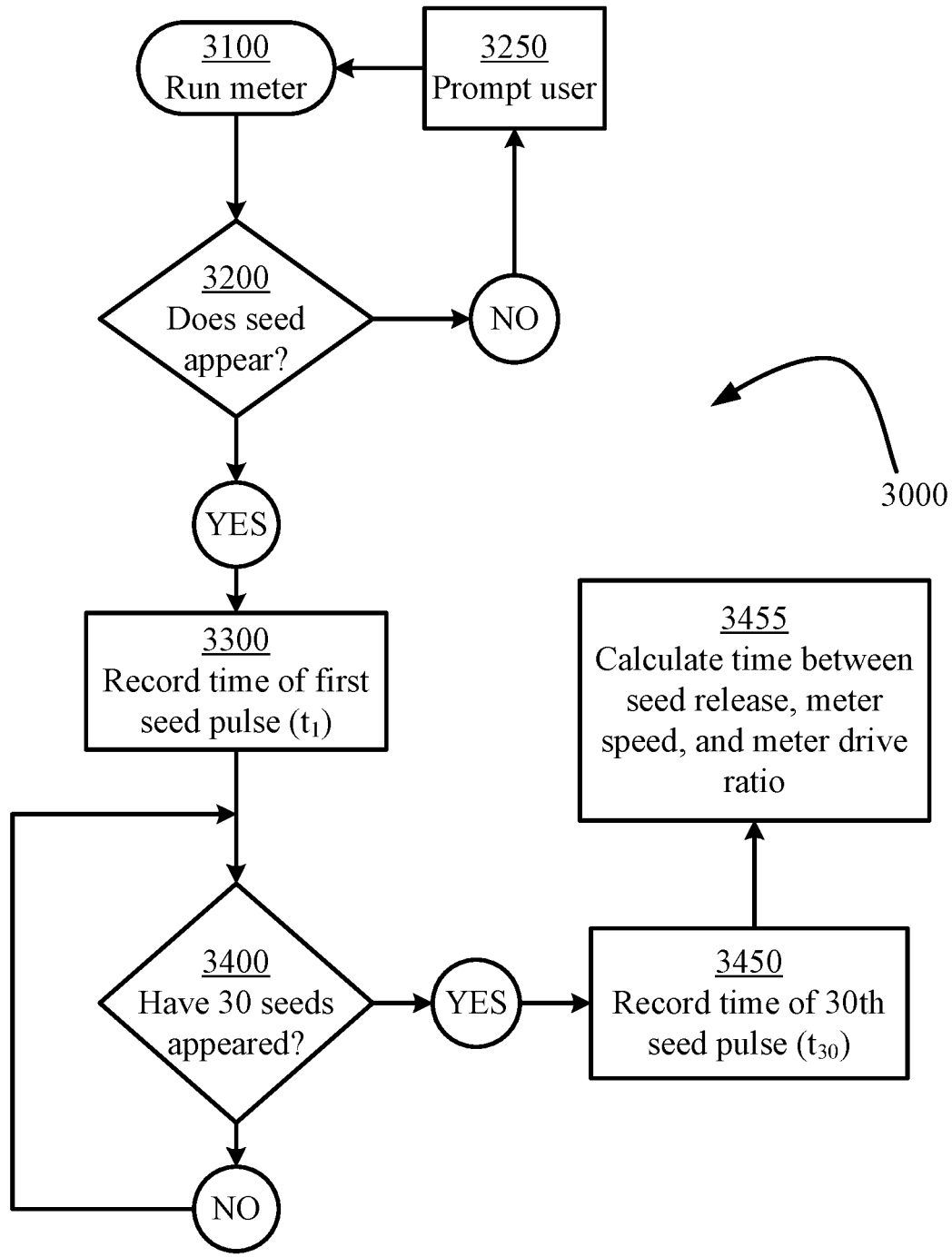
FIG. 14 is a schematic illustration of an embodiment of a method of determining a drive ratio between a seed meter and a variable rate drive.

FIG. 14 illustrates an embodiment of process 3000 to determine a drive ratio between the variable rate drive 1600 and the seed meter 30. At block 3100, the control unit 350 instructs the variable rate drive 1600 to drive the seed meter 30. At block 3200, if the control unit 350 does not receive a seed pulse, at block 3250, the planter monitor 1000 prompts the operator to check the seed hopper for seeds 11 or otherwise correct the operation of the planter 10 such that seeds 11 will begin being discharged by the seed meter 30 through the seed tube 32. Once the control unit receives a seed pulse at block 3200, the control unit 350 stores the time of the first observed seed pulse ($t_1$) at block 3300. Once the control unit 350 receives a predetermined number of seed pulses, e.g., 30, at block 3400, the control unit 350 stores the time of the thirtieth seed pulse ($t_{30}$) at block 3450. The difference between $t_{30}$ and $t_1$ divided by the number of seed pulses is equal to a time associated with a time between the release of seeds 11 by the seed meter 30 ($t_{nominal}$). The speed $w_m$ of seed meter 30 is then determined according to the following equation:

$$w_m = \frac{1}{(\text{Number of seeds per meter}) \times t_{nominal}}$$

Where: Number of seeds per meter=Total number of seed cavities, apertures or other seed entraining features on each seed meter 30.

The drive ratio R between the variable rate drive 1600 and the seed meter 30 is equal to the ratio between the number of encoder pulses that must be observed before the seed meter 30 has made one full revolution and the number of encoder pulses per revolution of the variable rate drive 1600.

The drive ratio R is preferably used by the control unit 350 to determine the rate at which to drive the variable rate drive 1600 in order to obtain a given speed $w_m$ of the seed meter and thus a corresponding time $t_{nominal}$ between the release of seeds 11. The values of $t_{nominal}$, $w_m$, and R are preferably calculated at step 3455 of process flow 3000.

Calibrating Start Delay and Stop Delay of a Swath Controller

Figure 15A:
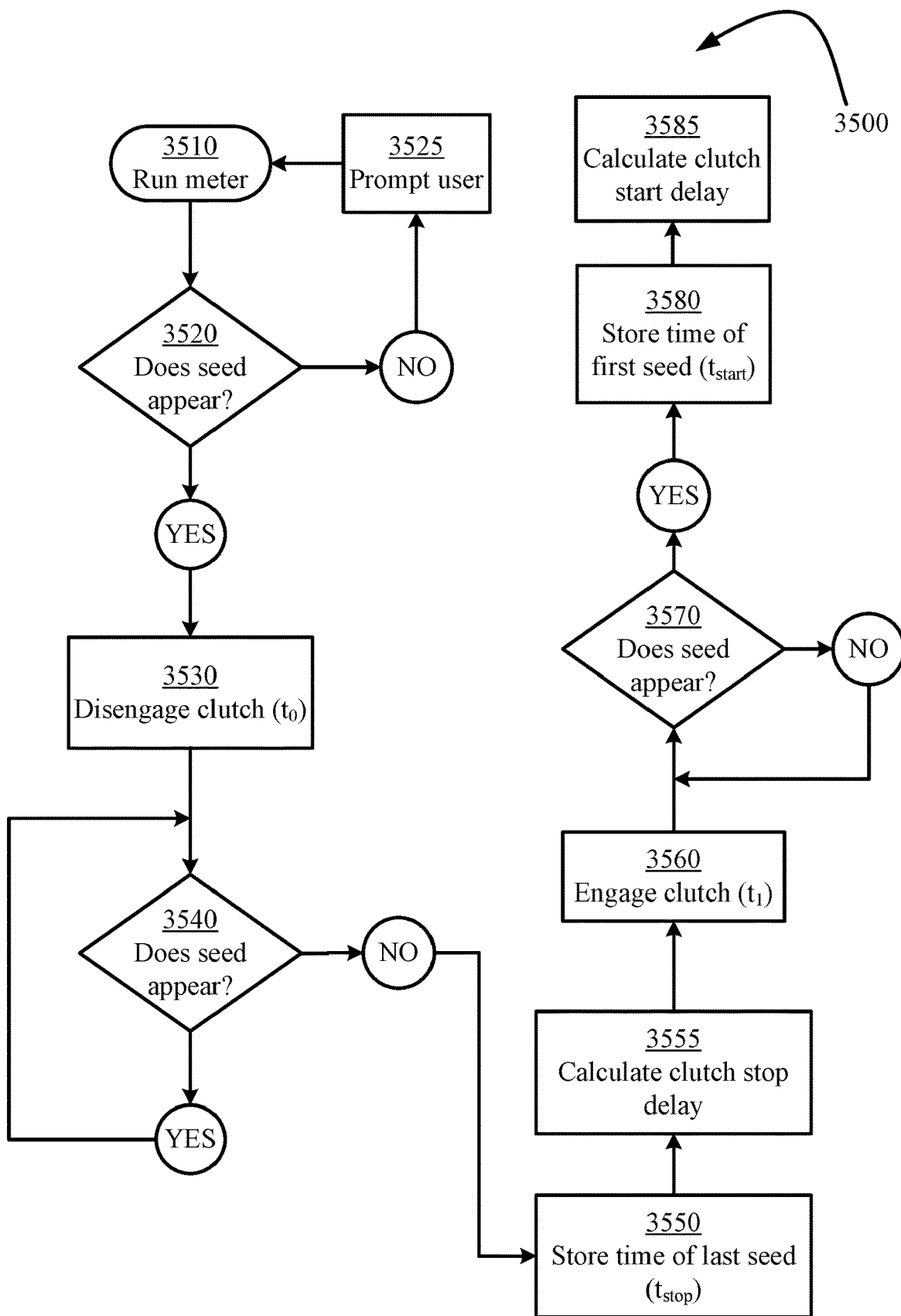
FIG. 15A is a schematic illustration of an embodiment of a method of determining a start delay and a stop delay of a swath controller.

FIG. 15A illustrates an embodiment of a process 3500 to determine a clutch start delay and clutch stop delay associated with a swath controller 1500. At block 3510, the control unit 350 instructs the variable rate drive 1600 to run. At block 3525, if the control unit 350 does not receive a seed pulse within a predetermined time at block 3520 (e.g., 5 seconds), then the planter monitor 1000 prompts the operator to check the seed hopper for seeds 11 or otherwise correct the operation of the planter 10 such that seeds 11 will begin being discharged by the seed meter 30 through the seed tube 32. At block 3530, if the control unit 350 receives a seed pulse, then after a predetermined time the control unit 350 instructs the swath controller 1500 to disengage at a time to in order to stop the seed meter 30 from being driven by the variable rate drive 1600. Time to is stored by the control unit 350. The control unit 350 then receives seed pulses at block 3540 until no seed pulse is received for a predetermined time. At block 3550, the control unit then records the time of the last seed pulse ($t_{stop}$). The difference between $t_{stop}$ and to represents a clutch stop delay associated with the swath controller 1500. The control unit 350 preferably calculates the clutch stop delay at block 3555. After a predetermined time, at block 3560, the control unit 350 then instructs the swath controller 1500 to engage at a time to such that the seed meter 30 is again driven by the variable rate drive 1600. Time $t_0$ is stored by the control unit 350. At block 3580, if a seed pulse is received by the control unit 350 at block 3570, then the control unit records the time of the first seed pulse ($t_{start}$). The difference between $t_{start}$ and $t_1$ represents a clutch start delay associated with the swath controller 1500. The control unit 350 preferably calculates the clutch start delay at block 3585.

The control unit 350 preferably uses the clutch start delay and clutch stop delay to adjust the time at which the control unit 350 sends control signals to the swath controller 1500 such that seed begins to dispense or stops dispensing at the desired position in the field.

Figure 15B:
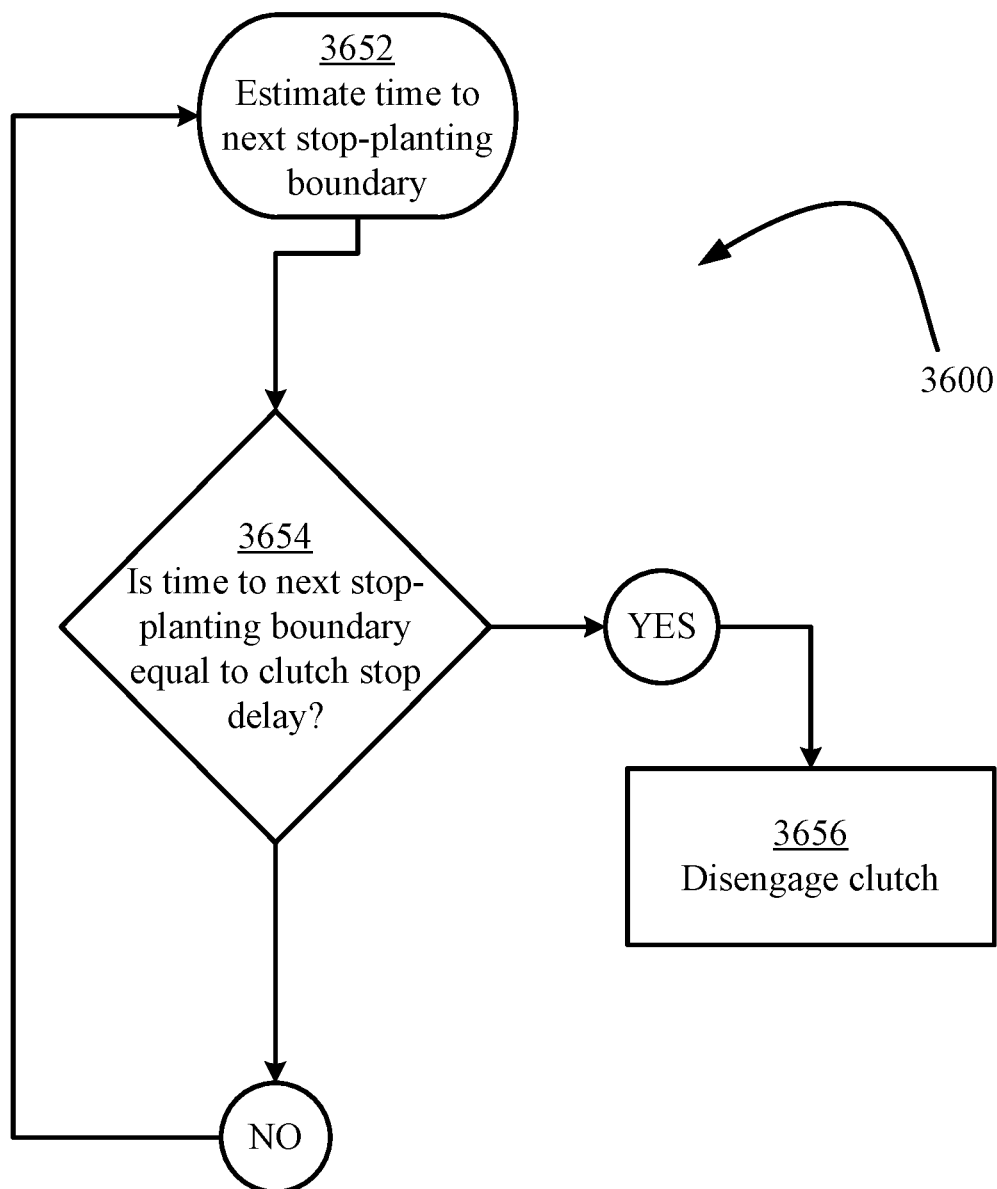
FIG. 15B is a schematic illustration of an embodiment of a method of disengaging a swath controller based on a swath control stop delay.
Figure 15C:
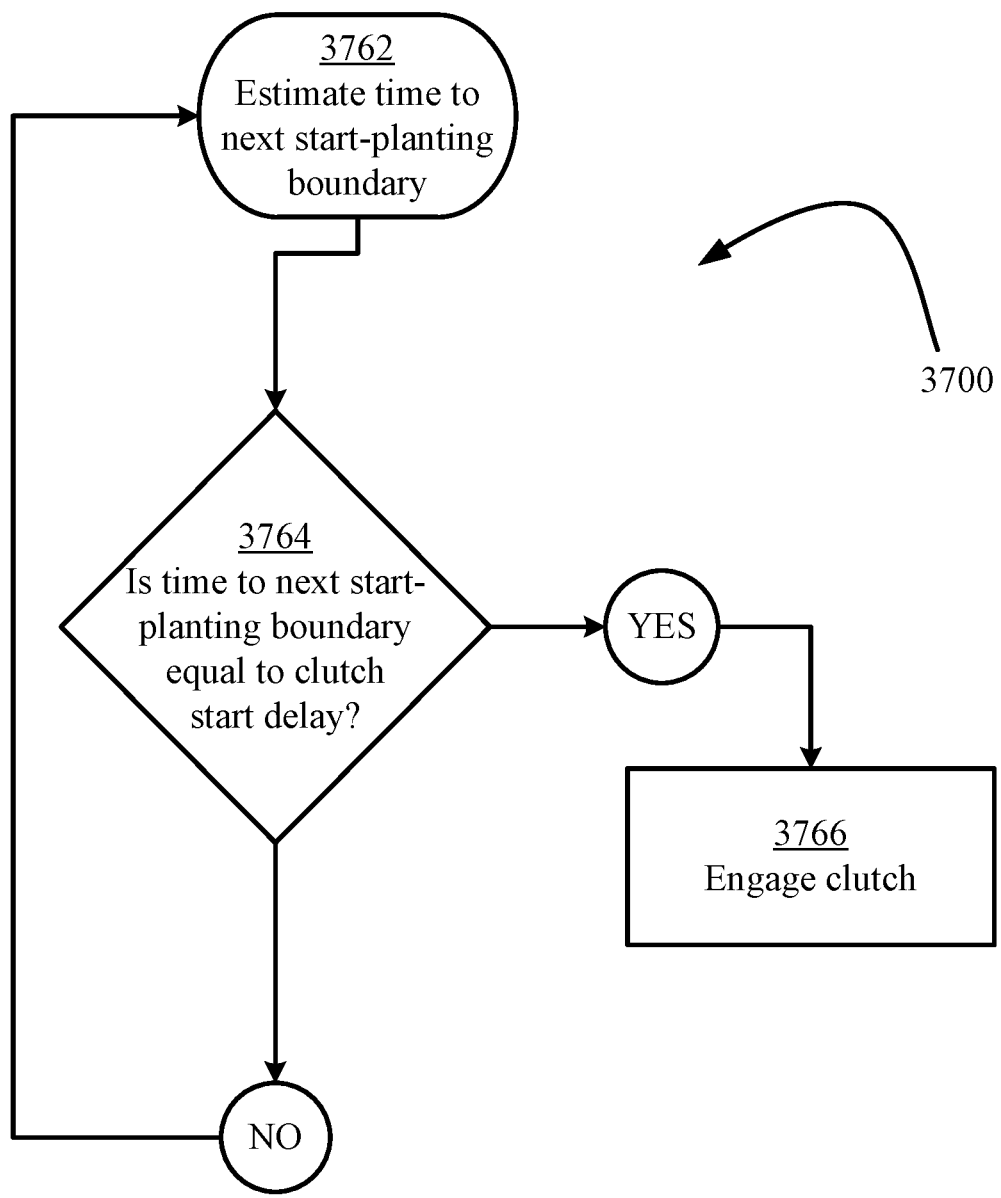
FIG. 15C is a schematic illustration of an embodiment of a method of engaging a swath controller based on a swath control start delay.

According to a preferred process 3600 illustrated in FIG. 15B, the control unit 350 estimates the time to the next stop-planting boundary at block 3652 (preferably using the current planter speed and the distance to the boundary) and compares said time to the clutch stop delay at block 3654. If the time to the next stop-planting boundary is equal to the clutch stop delay, then the control unit 350 preferably disengages the clutch at block 3656. According to a preferred process 3700 illustrated in FIG. 15C, the control unit 350 estimates the time to the next start-planting boundary at block 3762 (preferably using the current planter speed and the distance to the boundary) and compares said time to the motor stop delay at block 3764. If the time to the next start-planting boundary is equal to the motor stop delay, then the control unit 350 preferably starts the motor at block 3766. The foregoing process 3500 may be performed during in-field operation in order to determine the clutch start delay and clutch stop delay under current or near-current operating conditions.

Figure 16A:
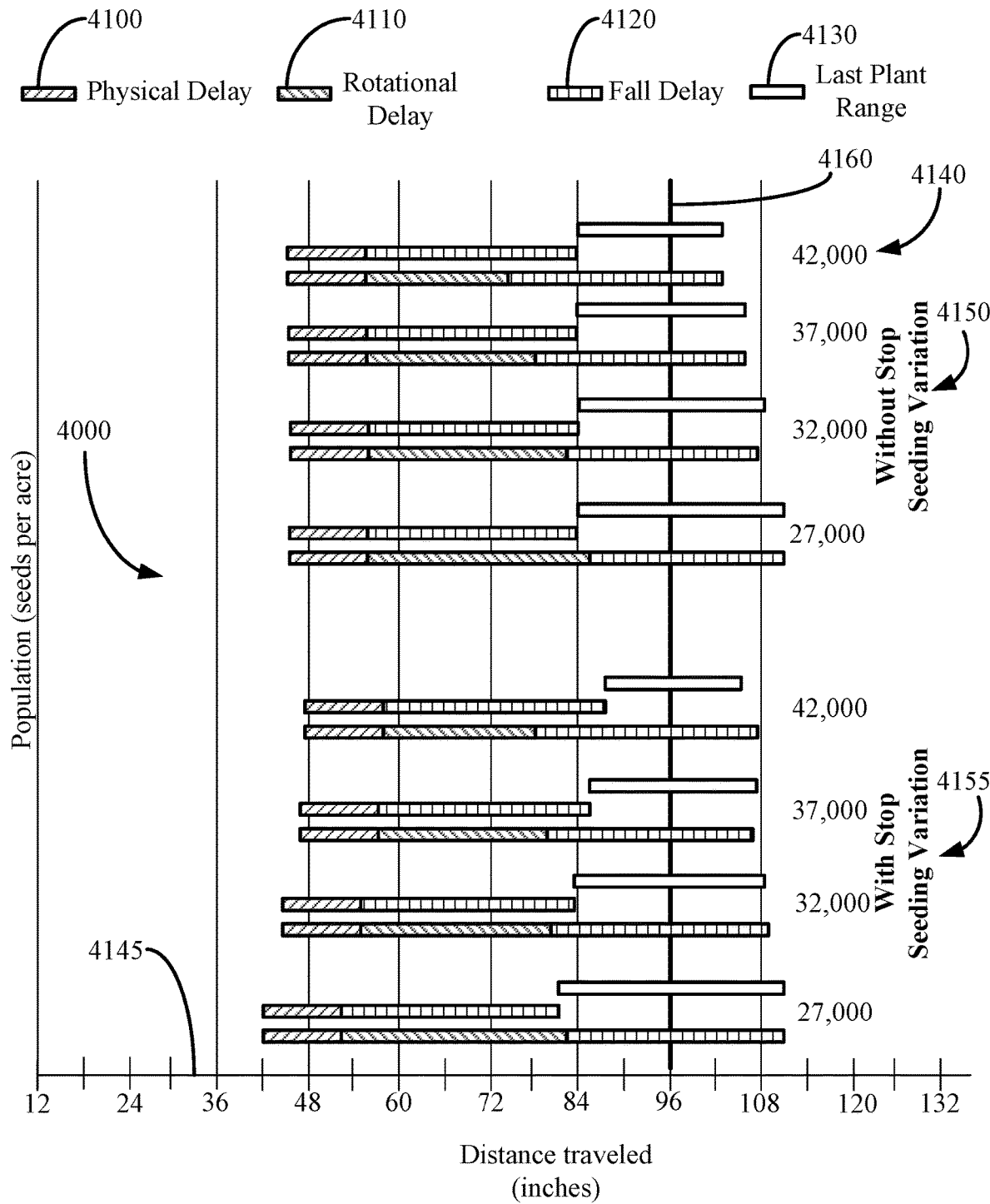
FIG. 16A is a graph of empirical data illustrating various delays associated with a swath controller.

Empirical data has shown that even under nearly equivalent operating conditions, there is a variation in clutch stop delay. FIG. 16A shows a graph 4000 illustrating components of delay associated with swath controllers 1500. The x-axis 4145 of graph 4000 represents the distance (in inches) traveled by the planter 10 after the clutch of the swath controller 1500 is disengaged. Data sets 4150 and 4155 represent tests performed at varying seed population rates 4140 in units of seeds per acre. Bars 4100 represent a physical delay (measured in inches traveled) associated with the electronic and pneumatic components of the variable rate drive 1600. Bars 4110 represent a rotational delay (measured in inches traveled) resulting from the mechanical action of the clutch in the swath controller 1500. Bars 4120 represent a delay (measured in inches traveled) associated with the time required for the last seed 11 to be released from the seed meter 30 and pass the seed sensor 200. Each set 4160 of data shows (from bottom to top) the total delay including the rotational delay 4110, the total delay not including the rotational delay 4110, and a last plant range 4130 representing the range between total delay without rotational delay 4110 and with rotational delay 4110.

Continuing to refer to FIG. 16A, the rotational delay 4110 varies because once the clutch is disengaged at a random rotational position of a shaft rotating within the clutch, the clutch will have to rotate through varying degrees before contacting a stopping member. The range in rotational delay 4110 will change based on the seed population rate because the clutch will be rotating faster at higher seed population rates.

Thus a preferred embodiment of seeding control system 1005 is configured to determine a range of delays between a control signal sent to the swath controller 1500 and an operational change in the swath controller 1500, namely engaging or disengaging the clutch. The control unit 350 preferably performs this process multiple times to obtain a distribution of clutch stop delays. The tenth percentile of the distribution of clutch stop delays is approximately equal to the physical delay 4100.

Figure 16B:
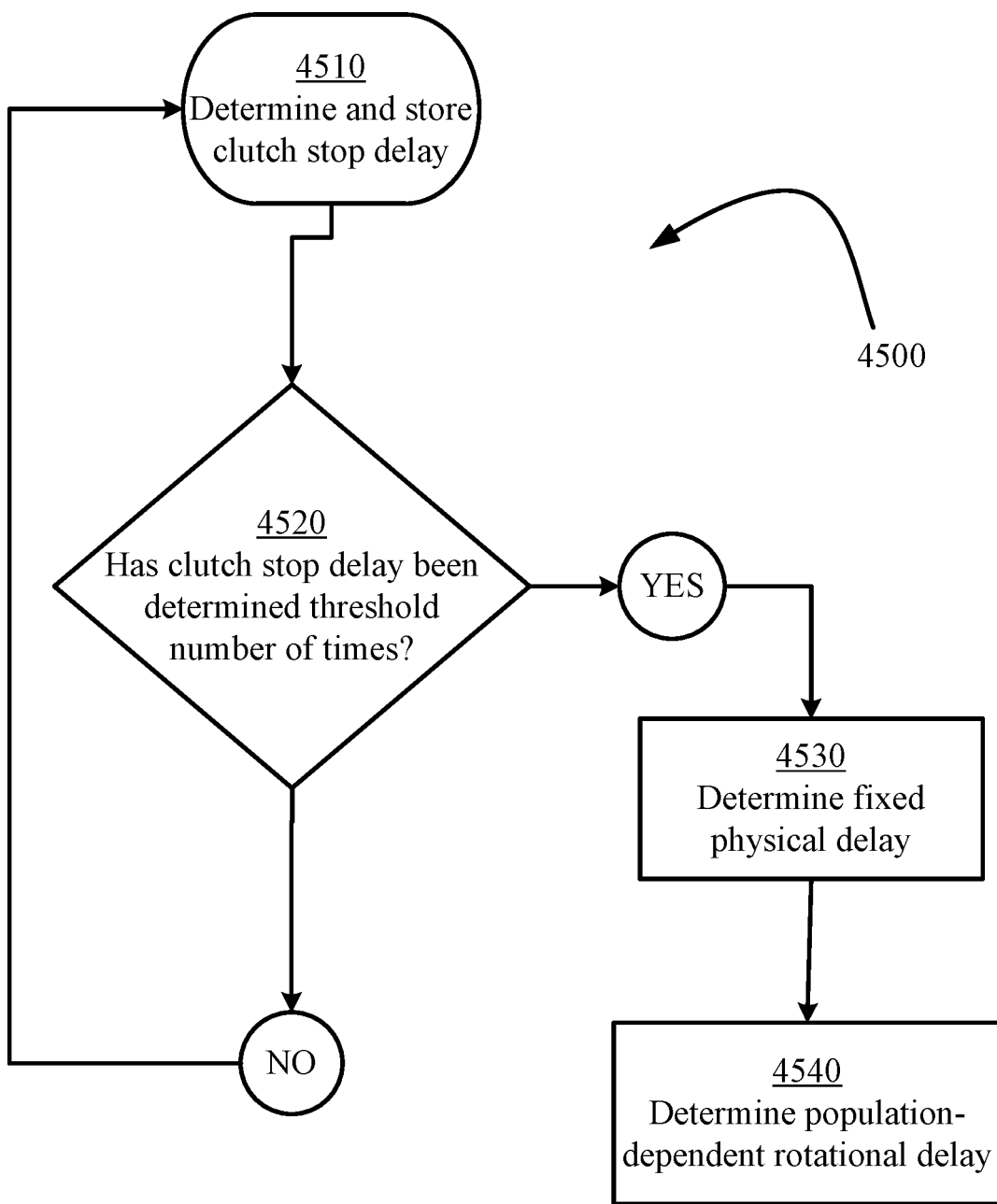
FIG. 16B is a schematic illustration of an embodiment of a method of determining components of a swath control stop delay.

In a preferred process 4500 illustrated in FIG. 16B, the control unit 350 determines and stores a total clutch stop delay (preferably as determined in blocks 3530 through 3555 in process 3500 of FIG. 6) at block 4510. This process is repeated (preferably at the same seed population rate) until clutch stop delay has been determined a threshold number of times (e.g., five) at block 4520. At block 4530, the control unit 350 preferably determines the fixed physical clutch stop delay 4100 (e.g., by finding the tenth percentile of the distribution of total delays). At block 4540, the control unit 350 preferably determines the population-dependent rotational clutch stop delay 4110 (e.g., by subtracting the 10th percentile of the distribution of total delays from the ninetieth percentile of the distribution of total delays).

In operation, when the control unit 350 is accessing the clutch stop delay (e.g., at step 3654 of process 3600 illustrated in FIG. 15B), the control unit preferably modifies the rotational delay 4110 based on the ratio between the population rate at which the rotational delay 4110 was determined and the active population rate. For example, if the rotational delay 4110 was determined at a population of 40,000 seeds per acre, then the rotational delay would be doubled at a population of 20,000 seeds per acre. Thus, the control unit 350 preferably adjusts a predicted component of clutch stop delay based on the active population rate.

As is illustrated in data set 4150 and data set 4155 of FIG. 16A, by adjusting the time at which the control signal is sent to swath controller 1500 according to this method at each seed population rate 4140, the last plant ranges 4130 become centered at a desired distance 4160 at each seed population rate 4140.

In addition, the planter monitor 1000 preferably displays the physical delay 4100, the rotational delay 4110 and the fall delay 4120 to the operator. The planter monitor also displays the sum of the fall delay 4120 and the physical delay 4100 to the operator. The planter monitor 1000 preferably displays said sum as a "Fixed Delay" and said rotational delay 4110 as a "Variable Delay." The planter monitor 1000 thus isolates a fixed portion of the clutch delay from a variable portion of the clutch delay associated with the swath control systems 1500. With this information, the operator is able to see the benefit of making changes in clutch mounting location in order to reduce the variable delay.

It should be appreciated that each calibration routine described herein could be performed prior to planting or in-field during planting. Prior to planting, a calibration routine may be initiated by the operator using a series of screens on the planter monitor 1000. The cab module 1105 preferably includes switches configured to allow the operator to briefly run the variable rate drives 1600 in order to load the seed meters 30 with seeds 11 prior to a pre-planting calibration routine. These switches may also be used to turn the variable rate drives 1600 on and off during a pre-planting calibration routine. The switches may also be used to selectively engage and disengage the swath controllers 1500 during a pre-planting calibration routine. During planting, as the variable rate drives 1600 and swath controllers 1500 are actually used in the field, the seed sensors 200 preferably continue to provide seed pulses to the control unit 350. Thus the control unit 350 is preferably able to measure delays associated with the variable rate drives 1600 and the swath controllers 1500 during planting.

Operation

As previously discussed, referring to FIG. 7, the seed pulses from the seed sensors 200 in each row unit 12 of the planter 10 are communicated to the planter monitor 1000. The planter monitor 1000 is in electrical communication with the GPS unit 100, the cab module 1105, the radar system 1205 and the control unit 350. The control unit 350 is in electrical communication with the individual swath controllers 1500 and variable rate drives 1600 and the height sensor 705.

The planter monitor 1000 is preferably configured to allow an operator to enter commands and input data including seed population rates and mapping information. The operator enters a desired seed population rate to the planter monitor 1000. The operator then pulls the planter 10 across the field. The planter monitor 1000 relays the desired seed population to the control unit 350 and determines the speed of the planter 10 using signals from the GPS unit 100 and/or the radar system 1205. The planter monitor 1000 displays the speed to the operator and transmits the speed to the control unit 350. The control unit 350 determines an appropriate speed of the seed meter 30 to obtain the desired seed population rate based on the speed of the planter 10 and other criteria including the size of seed meter 30, the number of seed-entraining features on seed meter 30, and other criteria affecting the rate of seed delivery. The control unit 350 determines the actual current speed of the seed meter 30 based on the encoder pulse of the variable rate drive 1600 and sends an appropriate control signal to the variable rate drives 1600. Each variable rate drive 1600 is configured to individually variably drive a seed meter 30 in each row unit of the planter 10 at a speed based on the control signal received from the control unit 350.

The control unit 350 uses a signal from the height sensor 705 to determine whether the planter 10 is lifted in a transport position. If the control unit 350 determines that the planter 10 is in a transport position, it will preferably direct the variable rate drives 1600 to stop driving the seed meters 30.

The seeding control system 1005 also generates a seed placement map. As each seed 11 passes through the seed tube 32, the seed sensor 200 sends a seed pulse to the control unit 350. The planter monitor 1000 associates the time of the seed pulse with a location of the GPS unit 100 and determines the location in the field that the seed 11 was dispensed based on the GPS offsets entered by the operator in the setup phase as previously described. The planter monitor 1000 then adds the position of the seed 11 to a seed placement map that preferably displayed to the operator and is used to determine "stop planting" conditions.

The planter monitor 1000 determines if a stop-planting condition exists for any swath (comprising a single row unit or a set of row units) of the planter 10, the planter monitor 1000 sends a stop-planting signal to the control unit 350. The control unit 350 then sends a signal to actuate the swath controller 1500 such that the clutch is disengaged so that the seed meters 30 in the swath are not being driven until the clutch is re-engaged when the stop planting condition passes. The clutches may be any pneumatic or electrical clutches as are known in the art.

Figure 19C:
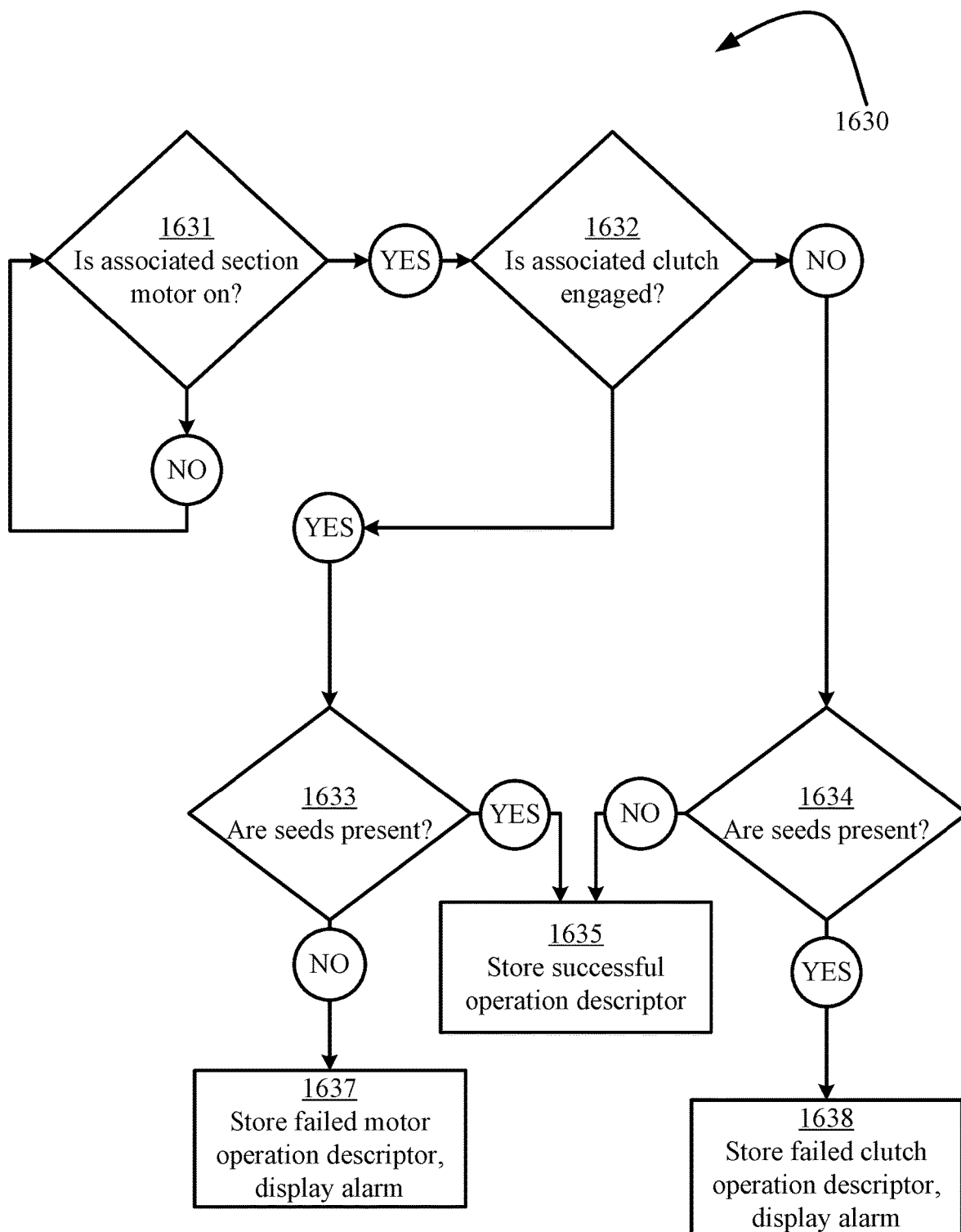
FIG. 19C is a schematic illustration of another embodiment of a method of identifying an operational problem with a seeding control system.

The seeding control system 1005 may also be used to alert the operator of operational problems within the variable rate drives 1600 and the swath controllers 1500 using seed pulses during in-field operations. Referring to FIG. 19C, a preferred process 1630 for providing such alerts to the operator in-field is illustrated. At block 1631, the control unit determines whether the variable rate drive 1600 associated with the row unit 12 is on. Once the variable rate drive is on, the control unit determines at block 1632 whether the swath controller 1500 associated with the row unit is engaged. If the associated swath controller is not engaged, then at block 1634 the control unit determines whether seeds are being deposited at the row. If seeds are not being deposited, a successful operation descriptor is stored at block 1635. If seeds are being deposited, a failed clutch operation descriptor is stored at block 1638 and an alarm is preferably displayed to the user. Returning to block 1632, if the associated swath controller 1500 is engaged, then at block 1633 the control unit determines whether seeds are being deposited. If seeds are being deposited, then a successful operation descriptor is stored at block 1635. If seeds are not being deposited, then a failed motor operation descriptor is stored at block 1637 and an alarm is preferably displayed to the user.

Where an alarm is displayed as a result of process 1630, the seeding control system is also preferably configured to determine whether an electrical or hydraulic error has occurred. It should be appreciated that the seeding control system 1005 could also be used to detect other operational problems with the planter 10 that affect the delivery of seeds.

Figure 17A:
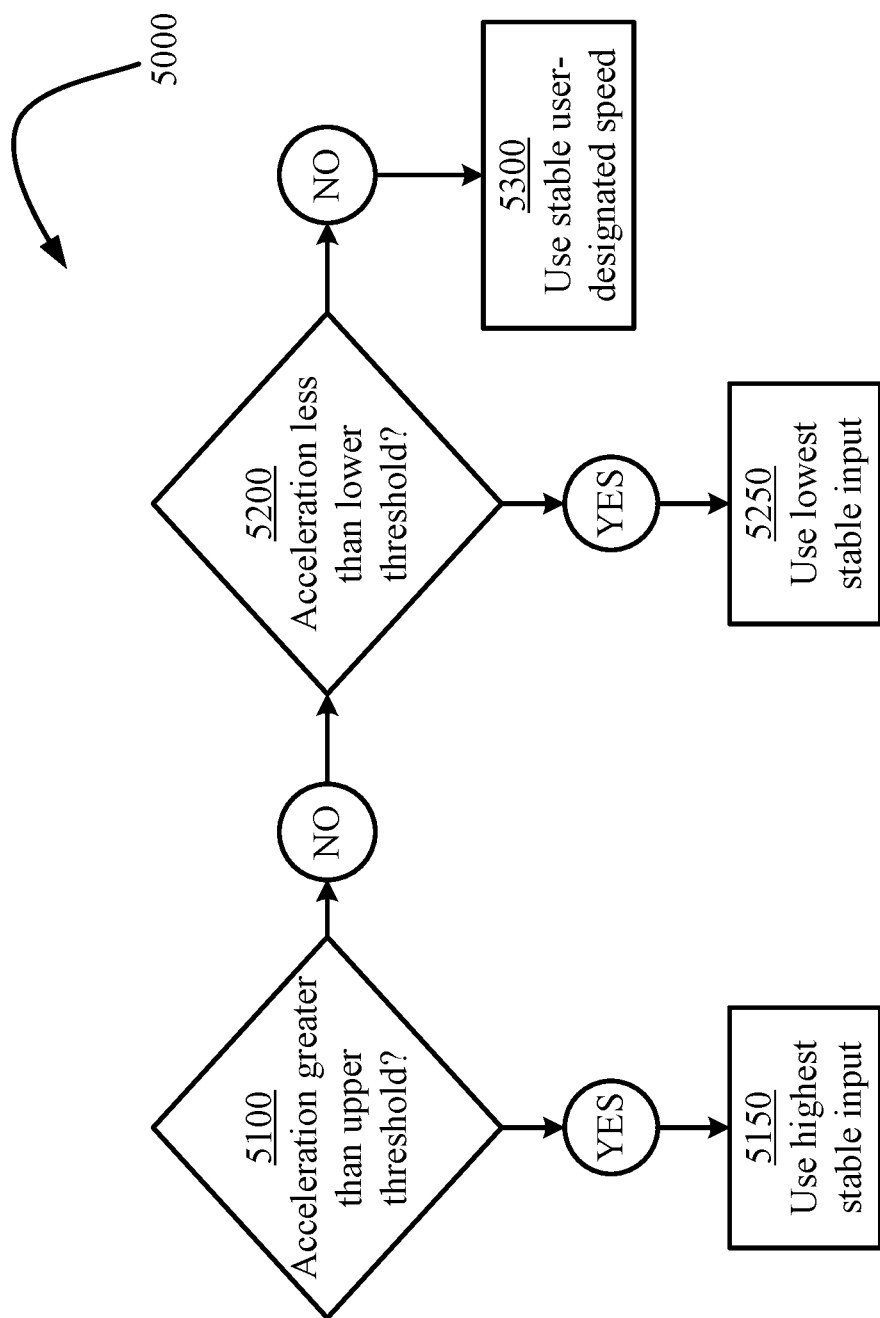
FIG. 17A is a schematic illustration of an embodiment of a method of selecting a speed input.

FIG. 17A illustrates a preferred process 5000 used by the seeding control system 1005 to determine the speed of planter 10. At block 5100, the control unit 350 determines whether acceleration of the planter 10 is greater than an upper threshold (preferably 1.5 ft/s$^2$) based on the signal provided by horizontal accelerometer 400 at block 5100. If the acceleration is greater than the upper threshold, the control unit 350 determines the speed of planter 10 using the highest stable value reported by the GPS unit 100 (the "GPS-reported speed") and the radar system 1205 (the "radar-reported speed") at block 5150. The planter monitor 1000 determines whether the GPS-reported speed is stable using an algorithm or other method as is known in the art. The cab module also includes processing circuitry configured to determine whether the radar-reported speed is stable using an algorithm or other method as is known in the art. At block 5200, if the acceleration is less than the upper threshold acceleration, then the control unit 350 determines whether the acceleration of planter 10 is less than a lower threshold (preferably −1.5 ft/s$^2$) based on the signal provided by horizontal accelerometer 400. At block 5250, if the acceleration is less than the lower threshold rate, the control unit 350 determines the speed of planter 10 using the lowest stable value reported by the GPS unit 100 (the "GPS-reported speed") and the radar system 1205 (the "radar-reported speed"). At block 5300, if the acceleration is greater than the lower threshold rate, the control unit 350 determines the speed of planter 10 using the speed input previously selected by the operator. As discussed herein under "Setup," the planter monitor 1000 is configured to allow a user to select a preferred speed input.

The control unit 350 will often need to stop the variable rate drives 1600 when the planter 10 is not moving. Likewise, the control unit 350 will need to start the variable rate drives 1600 when the planter 10 resumes moving. As previously discussed, empirical data has shown that data from the GPS unit 100 is delayed and untrustworthy at speeds lower than approximately one mile per hour. Empirical data has also shown that the GPS unit 100 will indicate speeds of 0.1 or 0.2 miles per hour when the planter 10 is actually stopped. For these reasons, speed inputs provided by those systems are non-ideal for determining when the planter 10 will stop or determining when the planter 10 has resumed travel. Thus in a preferred embodiment, the control unit 350 predicts a stopping time of the planter 10 using the signal from horizontal accelerometer 400 and sends an appropriately-timed control signal to stop the variable rate drive 1600.

Figure 17B:
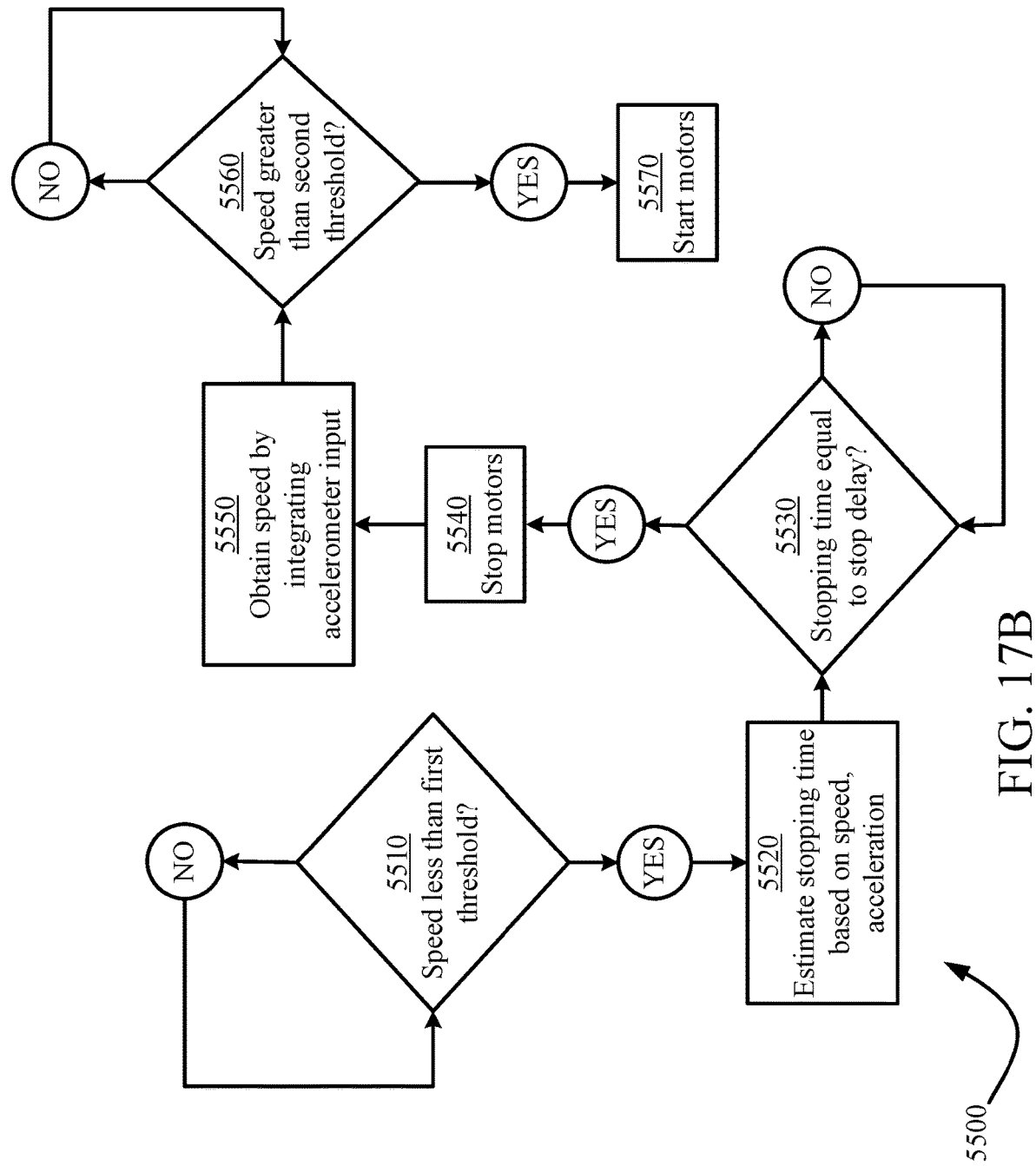
FIG. 17B is a schematic illustration of an embodiment of a method of stopping and starting a variable rate motor based on acceleration.

A preferred process 5500 for carrying out this method is illustrated in FIG. 17B. When the planter 10 decelerates to a speed less than a threshold speed (preferably 4.5 ft/s) at block 5510, the control unit 350 determines an estimated stopping time based on the currently utilized speed input and deceleration rates indicated by the horizontal accelerometer 400 at block 5520. When the stopping time is approximately equal to the stop delay associated with the variable rate drive (preferably determined as described above) at block 5530, the control unit 350 preferably instructs the variable rate drives 1600 to stop driving the seed meters 30 at block 5540.

Continuing to refer to FIG. 17B, after the planter 10 has stopped, the control unit 350 preferably determines that the planter 10 has resumed travel by integrating the signal provided by the horizontal accelerometer 400 at block 1550. When the speed determined from this method reaches a threshold value at block 5560, the control unit 350 preferably instructs the variable rate drives 1600 to resume driving the seed meters 30 at block 5570.

It should be appreciated that the methods described herein may be used to automatically alternate between other speed inputs as are known in the art. Thus the method described herein may be applied whenever one speed input is preferred over another in a certain range of any kinematic criteria including acceleration or velocity of the planter 10.

The planter monitor 1000 determines that a stop-planting condition exists when a section of the planter 10 is passing over a previously planted seed based on the seed placement map described above. The planter monitor 1000 also determines that a stop-planting condition exists when a section of the planter 10 travels across a boundary 1505 set by the operator. The boundary 1505 may comprise an outer boundary of the field to be planted or an inner boundary within said field enclosing a waterway or obstacle on which the operator does not wish to dispense seed. The boundary 1505 may also enclose a headland in which the operator intends to plant seed later. The operator may import such boundaries to the planter monitor 1000 using any suitable data storage device, including a USB flash drive, an internet connection, etc. The planter monitor 1000 may also record such boundaries by storing the location of the GPS unit 100 while the operator drives around the boundary. The planter monitor 1000 is preferably configured to allow the operator to instruct the swath controllers 1500 to stop the seed meters 30 during one, all, or any subset of the stop-planting conditions herein described.

Figure 18:
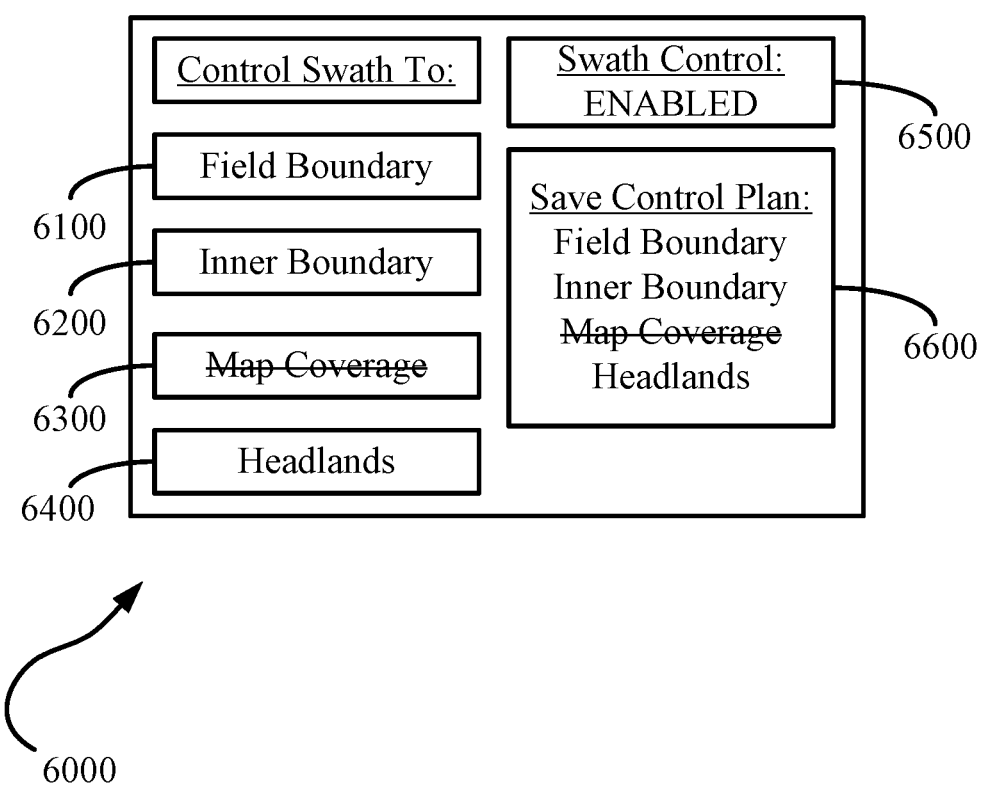
FIG. 18 is a schematic illustration of an embodiment of a user interface screen used to select stop-planting conditions.

FIG. 18 illustrates a user interface screen 6000 displayed on the planter monitor 1000 and configured to allow a user to select stop-planting conditions as described above. The operator may press or select windows 6100, 6200, 6300 or 6400 to activate or deactivate a stop-planting condition. When a stop-planting condition is deactivated, the associated window preferably displays the same using a strike-through or other indicator as illustrated in window 6300. The operator presses or selects window 6600 to save the set of activated stop-planting conditions. Window 6500 indicates whether swath controllers 1500 are enabled for any stop-planting condition.

It should be appreciated that in addition to the stop-planting conditions described herein, other stop-planting conditions based upon the location, speed, orientation or configuration of the planter 10 could be incorporated into the planter monitor 1000 or designated by the operator.

It should be appreciated that processing functions performed by the control unit 350 as recited herein could also be performed by the planter monitor 1000. In addition, processing functions performed by the planter monitor 1000 as recited herein could also be performed by the control unit 350.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A method of maintaining a desired seed population rate of a row unit of an agricultural planter during periods of acceleration of the agricultural planter while planting a field, wherein the row unit includes a seed meter, a variable rate drive and a seed sensor, the seed meter configured to dispense singulated seeds by rotation of a seed disc, the variable rate drive driving rotation of the seed disc, the seed sensor configured to generate a seed pulse upon the dispensed singulated seeds passing the seed sensor, said method comprising:

(a) communicating inputted criteria entered via a planter monitor to a control unit, the control unit controlling the variable rate drive, the inputted criteria including a desired seed population rate, a number of seed entraining features on the seed disc, a diameter of the seed entraining features on the seed disc, and a preferred planter ground speed;

(b) the control unit determining the rotational speed of the seed disc based on sensed revolutions of the variable rate drive;

(c) via signals generated by a GPS system, determining a GPS-reported ground speed of the agricultural planter;

(d) via signals generated by a radar system, determining a radar-reported ground speed of the agricultural planter;

(e) identifying a highest stable ground speed and a lowest stable ground speed from the GPS-reported ground speed and the radar-reported ground speed;

(f) via signals generated by a horizontal accelerometer, determining horizontal acceleration of the agricultural planter;

(g) if the measured horizontal acceleration is greater than a predefined upper acceleration threshold, the control unit generating a signal to cause the variable rate drive to drive the seed disc at a rotational speed to maintain the desired seed population rate based on the determined highest stable ground speed;

(h) if the measured horizontal acceleration is less than a predefined lower acceleration threshold, the control unit generating a signal to cause the variable rate drive to drive the seed disc at a rotational speed to maintain the desired seed population rate based on the determined lowest stable ground speed; and (i) if the measured horizontal acceleration is less than the predefined upper acceleration threshold and is greater than the predefined lower acceleration threshold, the control unit generating a signal to cause the variable rate drive to drive the seed disc at a rotational speed to maintain the desired seed population rate based on the inputted preferred planter ground speed.

2. The method of claim 1, further comprising a method of estimating stopping times of the planter in order to stop rotation of the seed disc driven by the variable rate drive in order to minimize over planting and under planting, the method comprising:

via signals generated by the horizontal accelerometer, determining when the agricultural planter is decelerating and calculating a deceleration rate;

if the planter ground speed falls below a predetermined low planter speed threshold, calculating a stopping time of the agricultural planter based on the calculated deceleration rate;

upon the calculated stopping time of the planter equaling a predetermined stop delay associated with the variable rate drive, the control unit generating a signal to cause the variable rate drive to stop driving the seed disc.

3. The method of claim 2, further comprising a method of resuming driving of the seed disc by the variable rate drive from a stopped condition in order to minimize over planting and under planting, the method comprising:

via signals generated by the horizontal accelerometer, determining when the planter has resumed a forward direction of travel from a stationary position;

integrating the signals generated by the horizontal accelerometer to determine when the ground speed of the agricultural planter reaches a minimum planter speed threshold;

upon the ground speed of the planter achieving the minimum planter speed threshold, the control unit generating a signal to cause the variable rate drive to start driving the seed disc.

4. The method of claim 1, wherein the predefined upper acceleration threshold is about 1.5 ft/s$^2$.

5. The method of claim 1, wherein the predefined lower acceleration threshold is about −1.5 ft/s$^2$.

6. The method of claim 2, wherein the predetermined low planter speed threshold is about 4.5 ft/s.

7. The method of claim 2, wherein the stop delay is determined by generating a stop signal, via the control unit, to cause the variable rate drive to stop driving rotation of the seed disc of the row unit;

measuring a time difference between a time when the stop signal is generated until a last seed pulse is thereafter generated by the seed sensor of the row unit;

storing in memory the measured time difference as the stop delay.

8. The method of claim 1, further comprising a method of determining a start delay:

via the control unit, generating a start signal to cause the variable rate drive to start driving rotation of the seed disc of the row unit;

measuring a time difference between a time when the start signal is generated until a first seed pulse is thereafter generated by the seed sensor of the row unit;

storing in memory the measured time difference as the start delay.

9. The method of claim 8, further comprising:

generating an alert if no seed pulse is generated by the seed sensor of the row unit within a predetermined time after generating the start signal.

10. The method of claim 1, further comprising:

via the GPS system, identifying a seed placement location in the field of each generated seed pulse; and storing in memory each seed placement location.

11. The method of claim 10, further comprising:

generating a seed placement map of each seed placement location within the field.

12. The method of claim 10, wherein the agricultural planter includes a plurality of the row units arranged in a plurality of swaths, wherein each swath includes at least one of the row units, each swath further including a swath controller in signal communication with the control unit and the variable rate drive of each of the at least one row units comprising each swath.

13. The method of claim 12, wherein each swath comprises one row unit such that the swath controller provides one-row swath control.

14. The method of claim 12, wherein each swath comprises multiple row units such that the swath controller provides multi-row swath control.

15. The method of claim 1, wherein the inputted criteria includes a desired coverage pattern with respect to a stop planting boundary, the coverage pattern selected from a group comprising: underplanting the stop-planting boundary, overplanting the stop-planting boundary, and 50/50-overplanting/underplanting of the stop-planting boundary, the stop planting boundary including any previously stored seed placement location, a previously determined field outer boundary, and a previously determined field inner boundary.

16. The method of claim 15, further comprising:

via the control unit, actuating the swath controller to operably disengage the variable rate drive to stop rotation of the seed disc of the at least one of the row units comprising the swath crossing the stop-planting boundary.

\* \* \* \* \*